United States Patent
Takamatsu et al.

(10) Patent No.: US 9,825,529 B2
(45) Date of Patent: Nov. 21, 2017

(54) VOLTAGE CONVERSION CONTROL APPARATUS FOR A BOOST CONVERTER CONFIGURED TO BOOST OR STEP DOWN OUTPUT VOLTAGE OF AN ELECTRICITY STORAGE APPARATUS

(71) Applicant: TOYOTA JIDOSHA KABUSHIKI KAISHA, Toyota-shi, Aichi (JP)

(72) Inventors: Naoyoshi Takamatsu, Sunto-gun (JP); Masaki Okamura, Toyota (JP); Toshifumi Yamakawa, Sunto-gun (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 94 days.

(21) Appl. No.: 14/435,002

(22) PCT Filed: Sep. 30, 2013

(86) PCT No.: PCT/JP2013/076558
§ 371 (c)(1),
(2) Date: Apr. 10, 2015

(87) PCT Pub. No.: WO2014/057837
PCT Pub. Date: Apr. 17, 2014

(65) Prior Publication Data
US 2015/0288281 A1 Oct. 8, 2015

(30) Foreign Application Priority Data
Oct. 12, 2012 (JP) .................................. 2012-227387

(51) Int. Cl.
*H02M 3/157* (2006.01)
*B60L 9/18* (2006.01)
(Continued)

(52) U.S. Cl.
CPC ............... *H02M 3/157* (2013.01); *B60L 9/18* (2013.01); *B60L 11/14* (2013.01); *H02M 3/156* (2013.01);
(Continued)

(58) Field of Classification Search
CPC . Y02T 10/7077; Y02T 10/7225; Y02T 10/70; H02M 3/156; H02M 2003/1552;
(Continued)

(56) References Cited

U.S. PATENT DOCUMENTS

| | | | | |
|---|---|---|---|---|
| 6,090,008 A | * | 7/2000 | Hoshiya | F16H 61/061 477/118 |
| 2001/0001227 A1 | * | 5/2001 | Notohara | H02M 5/4585 318/268 |

(Continued)

FOREIGN PATENT DOCUMENTS

| | | |
|---|---|---|
| DE | 112005002531 T5 | 9/2007 |
| DE | 102007007249 A1 | 8/2008 |

(Continued)

*Primary Examiner* — Gustavo Rosario Benitez
(74) *Attorney, Agent, or Firm* — Andrews Kurth Kenyon LLP

(57) ABSTRACT

A voltage conversion control apparatus is a voltage conversion control apparatus which controls a voltage converter having an upper switching element and a lower switching element, and has a calculating device which calculates duty ratio such that output current of an electricity storage apparatus reaches target value and the duty ratio is within predetermined allowable range; a limit relaxing device which relaxes at least one of upper limit value and lower limit value of the allowable range on the basis of magnitude relationship between predetermined threshold value and current deviation which is obtained by subtracting the output current from the target value; and a controlling device which controls the upper switching element and the lower switch- (Continued)

ing element to perform a switching control on the basis of the duty ratio which is calculated by the calculating device.

11 Claims, 15 Drawing Sheets

(51) Int. Cl.
    *B60L 11/14*           (2006.01)
    *H02M 3/156*         (2006.01)
    *H02M 3/155*         (2006.01)

(52) U.S. Cl.
    CPC ..... *B60L 2210/14* (2013.01); *B60L 2240/525* (2013.01); *B60L 2240/526* (2013.01); *B60L 2240/527* (2013.01); *B60L 2240/529* (2013.01); *H02M 2003/1552* (2013.01); *Y02T 10/70* (2013.01); *Y02T 10/7077* (2013.01); *Y02T 10/7225* (2013.01)

(58) Field of Classification Search
    CPC ....... H02M 3/157; H02M 2007/53878; H02M 2007/53873; H02M 2007/53876; H02M 7/42; H02M 7/44; H02M 7/66; H02M 7/68; H02M 7/72; B60L 9/18; B60L 11/14; B60L 2210/14; B60L 2240/525; B60L 2240/526; B60L 2240/529; B60L 2240/527

See application file for complete search history.

(56) References Cited

U.S. PATENT DOCUMENTS

| | | | |
|---|---|---|---|
| 2005/0067999 A1* | 3/2005 | Okamura | B60L 15/2045 318/800 |
| 2006/0055349 A1* | 3/2006 | Nakayama | B60L 11/123 318/400.18 |
| 2006/0114702 A1* | 6/2006 | Yamada | H02M 1/38 363/132 |
| 2007/0195568 A1 | 8/2007 | Sato | |
| 2009/0146588 A1* | 6/2009 | Okamura | H02M 3/156 318/139 |
| 2010/0013421 A1* | 1/2010 | Itoh | H02M 7/00 318/400.09 |
| 2010/0101875 A1* | 4/2010 | Maeda | B60L 3/003 180/65.1 |
| 2010/0176757 A1* | 7/2010 | Yamakawa | H02M 7/53873 318/400.09 |
| 2011/0062929 A1 | 3/2011 | Strydom et al. | |
| 2011/0261589 A1* | 10/2011 | Goto | H02M 3/33592 363/15 |

FOREIGN PATENT DOCUMENTS

| | | |
|---|---|---|
| EP | 1473819 A1 | 11/2004 |
| EP | 1971021 A2 | 9/2008 |
| JP | 2006-115635 A | 4/2006 |
| JP | 3906843 B2 | 4/2007 |
| JP | 2008-172952 A | 7/2008 |

\* cited by examiner

[FIG. 1]
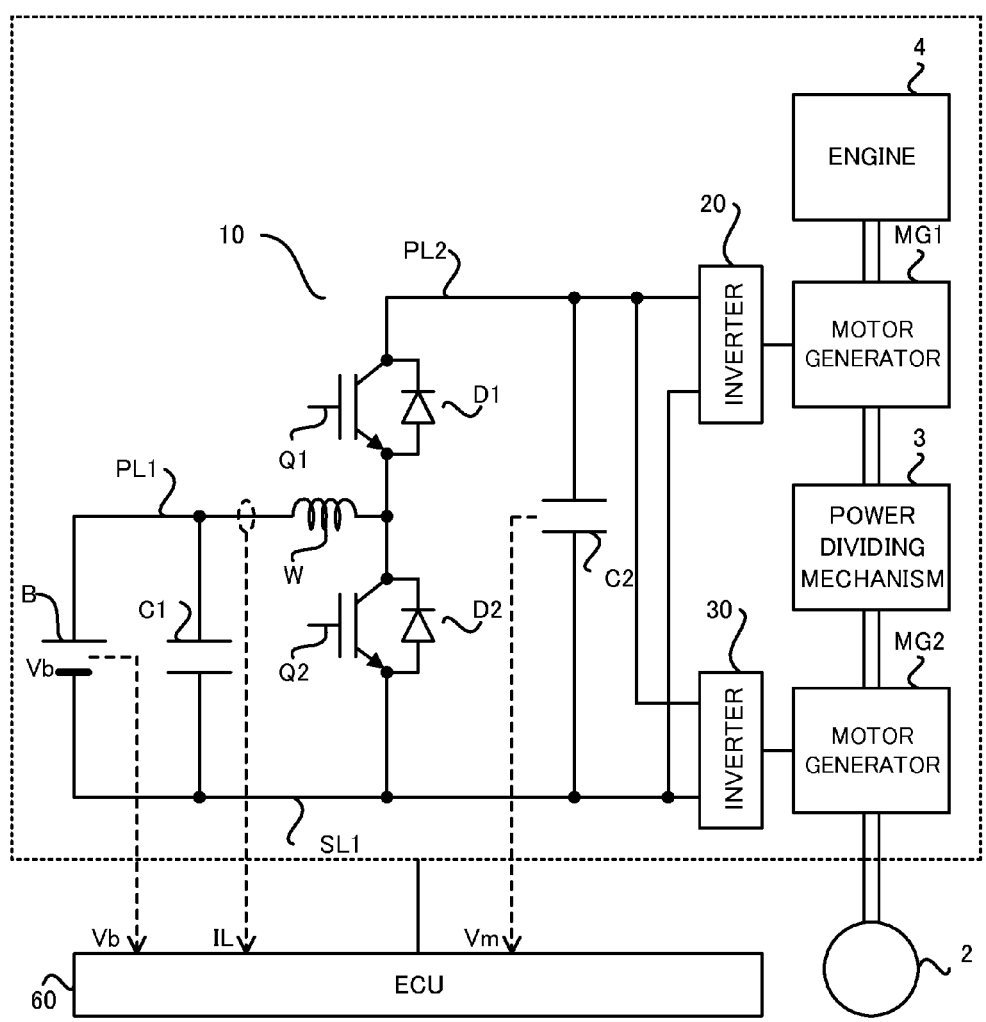

[FIG. 2]
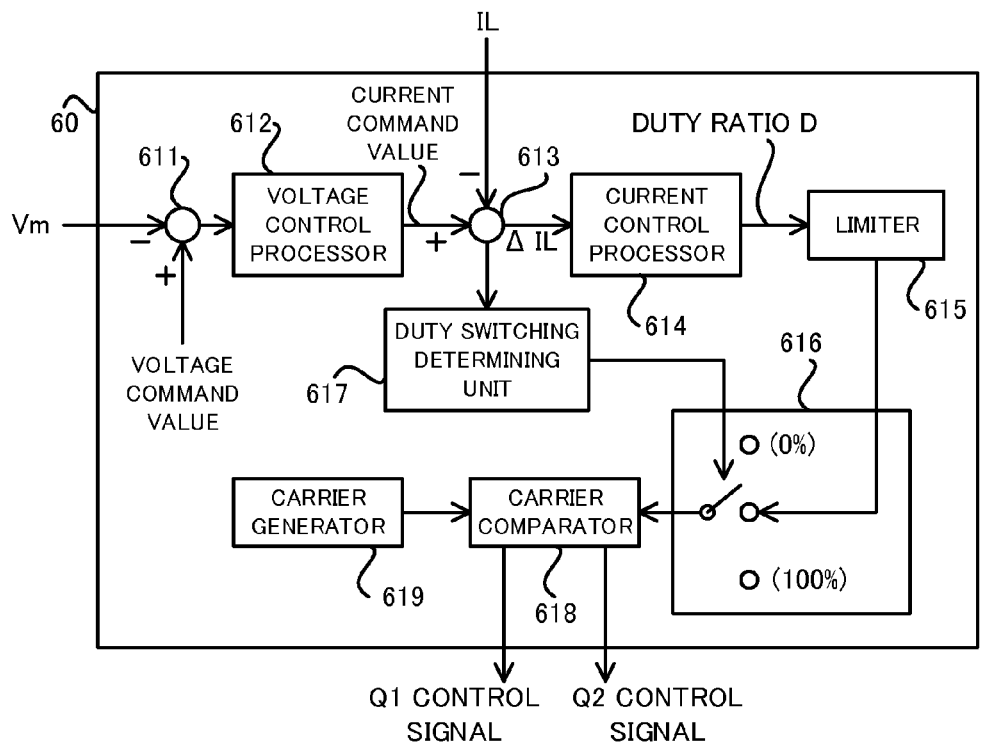

[FIG. 3]
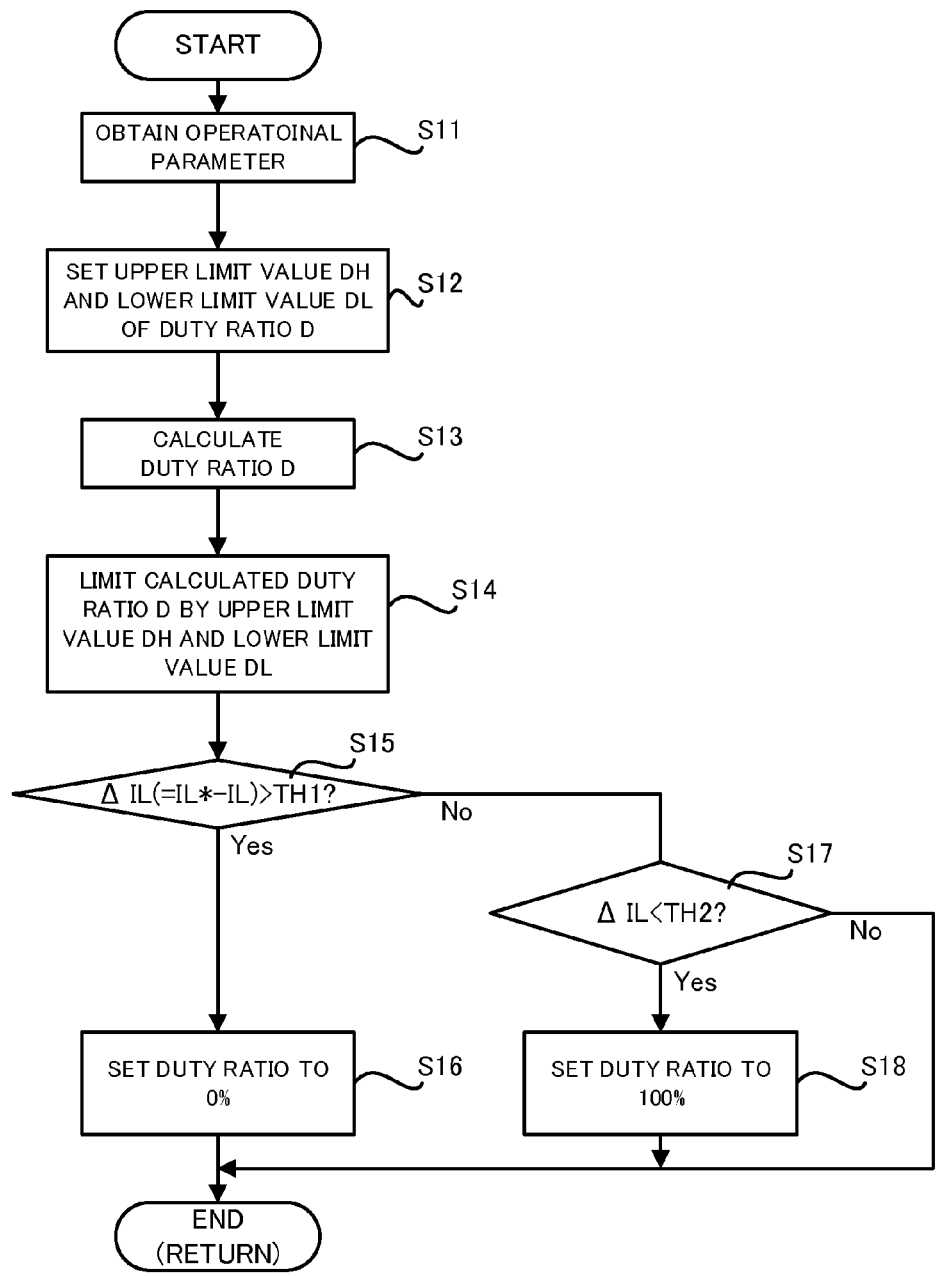

[FIG. 4]
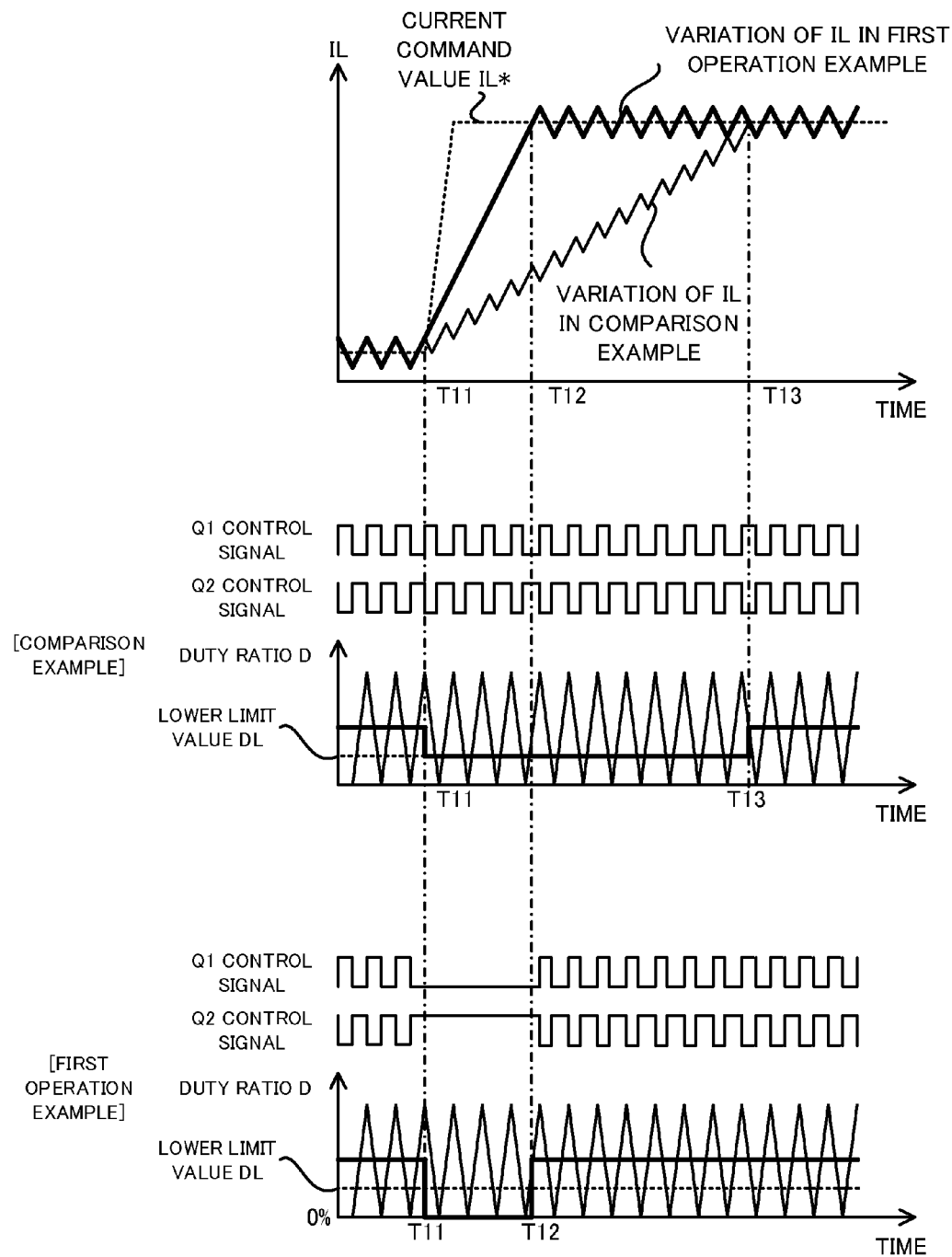

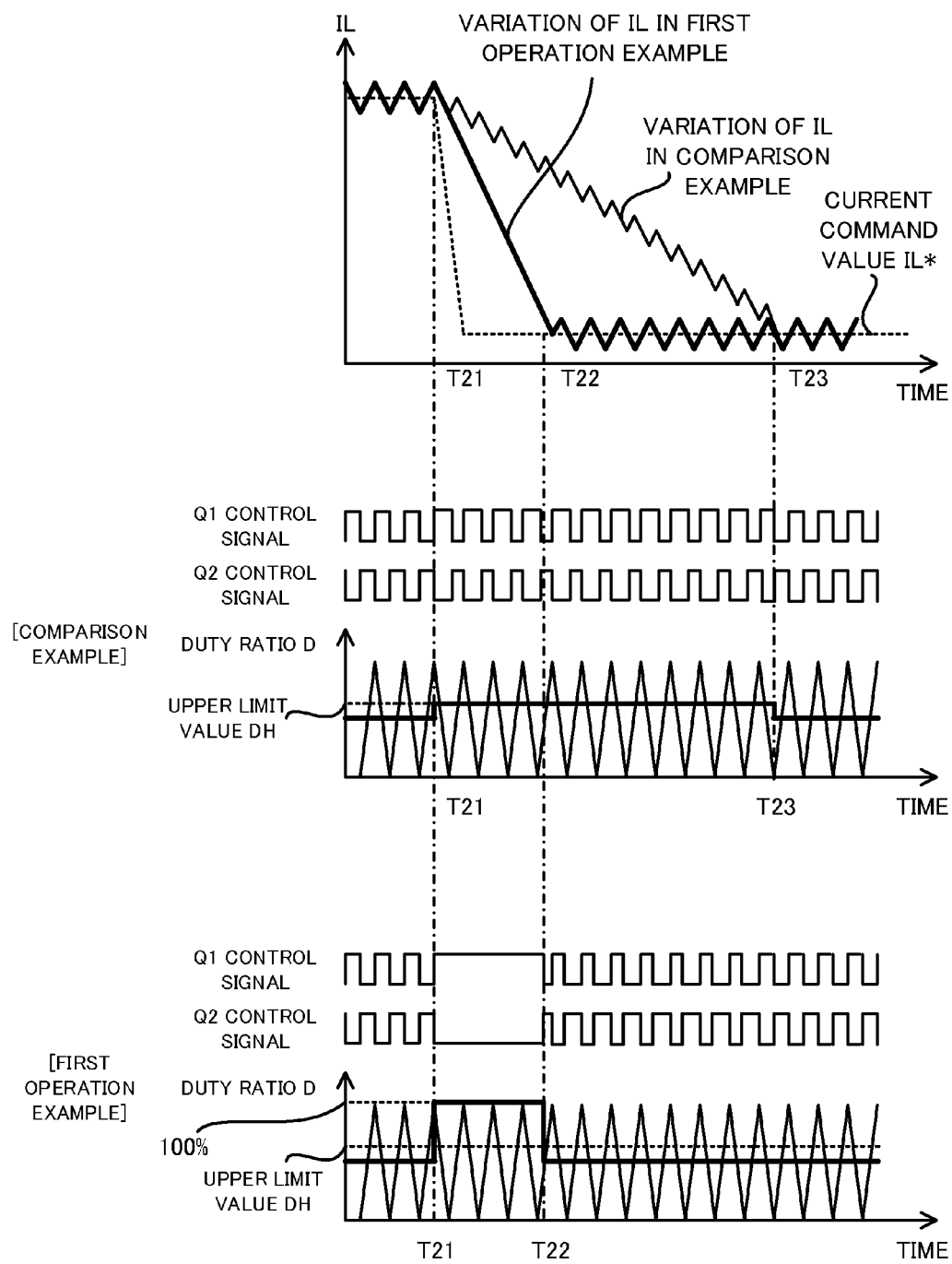
[FIG. 5]

[FIG. 6]
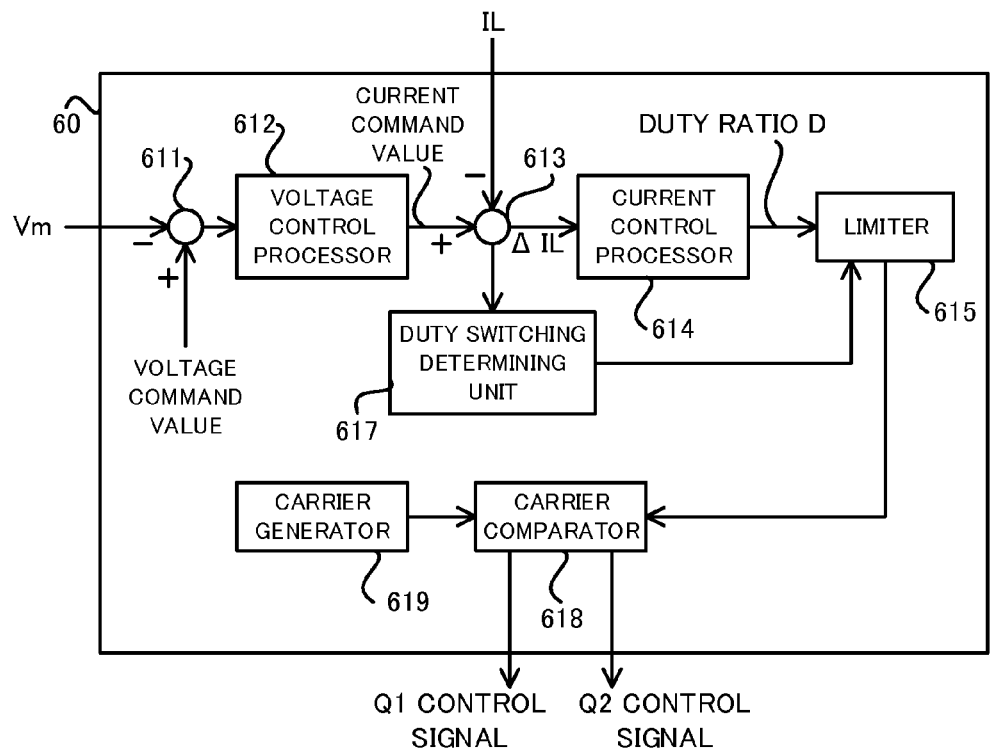

[FIG. 7]
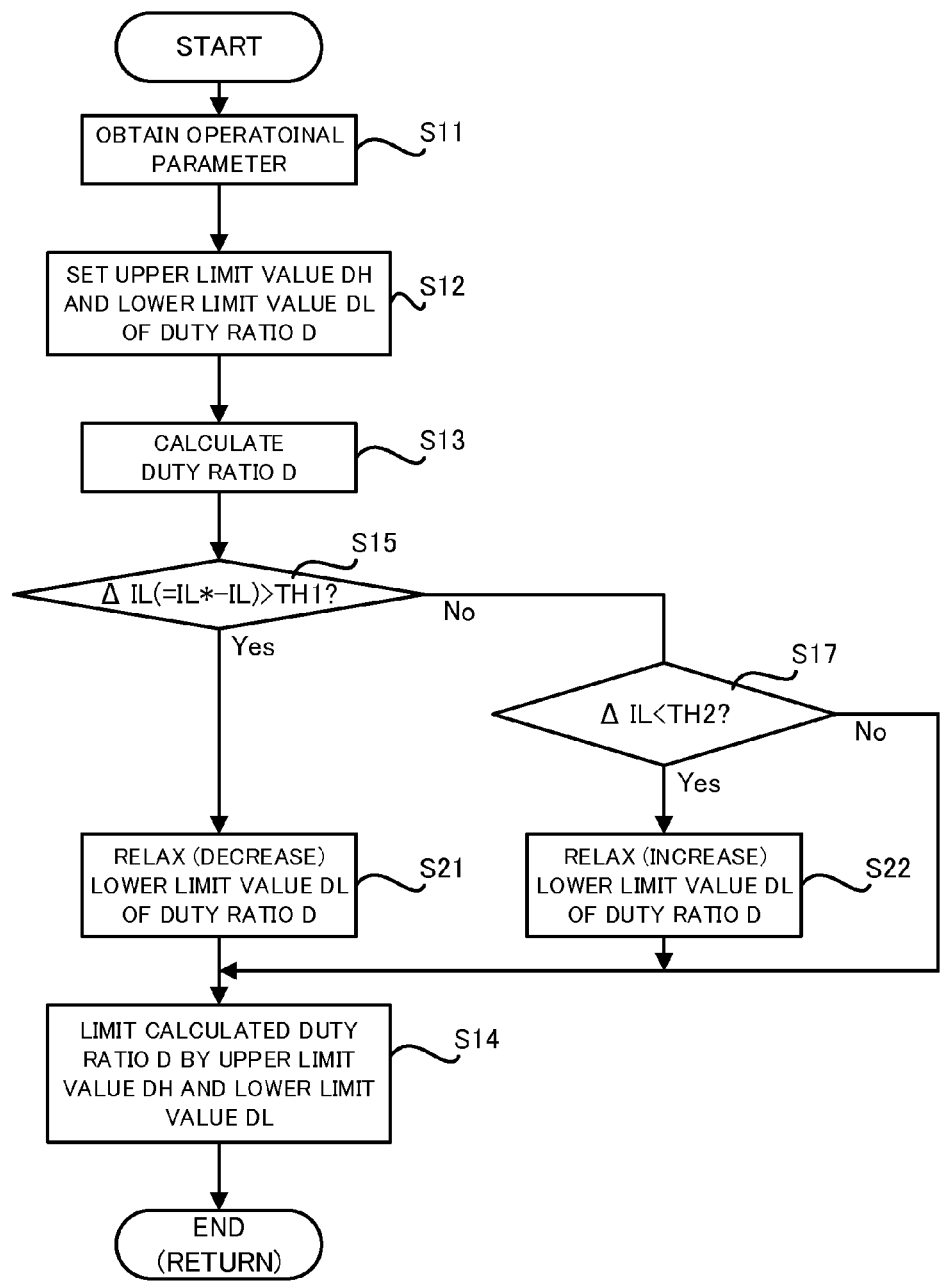

[FIG. 8]
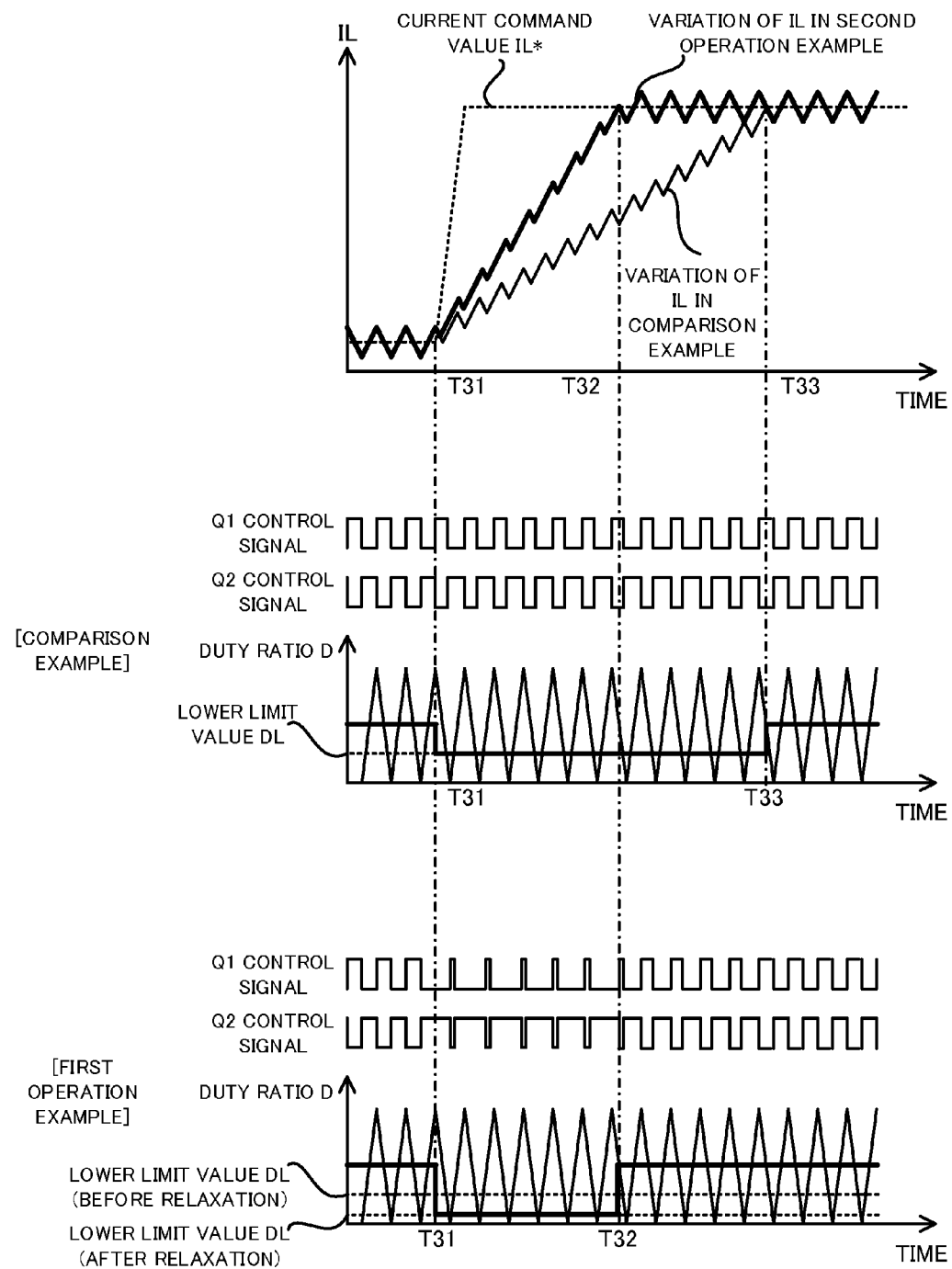

[FIG. 9]
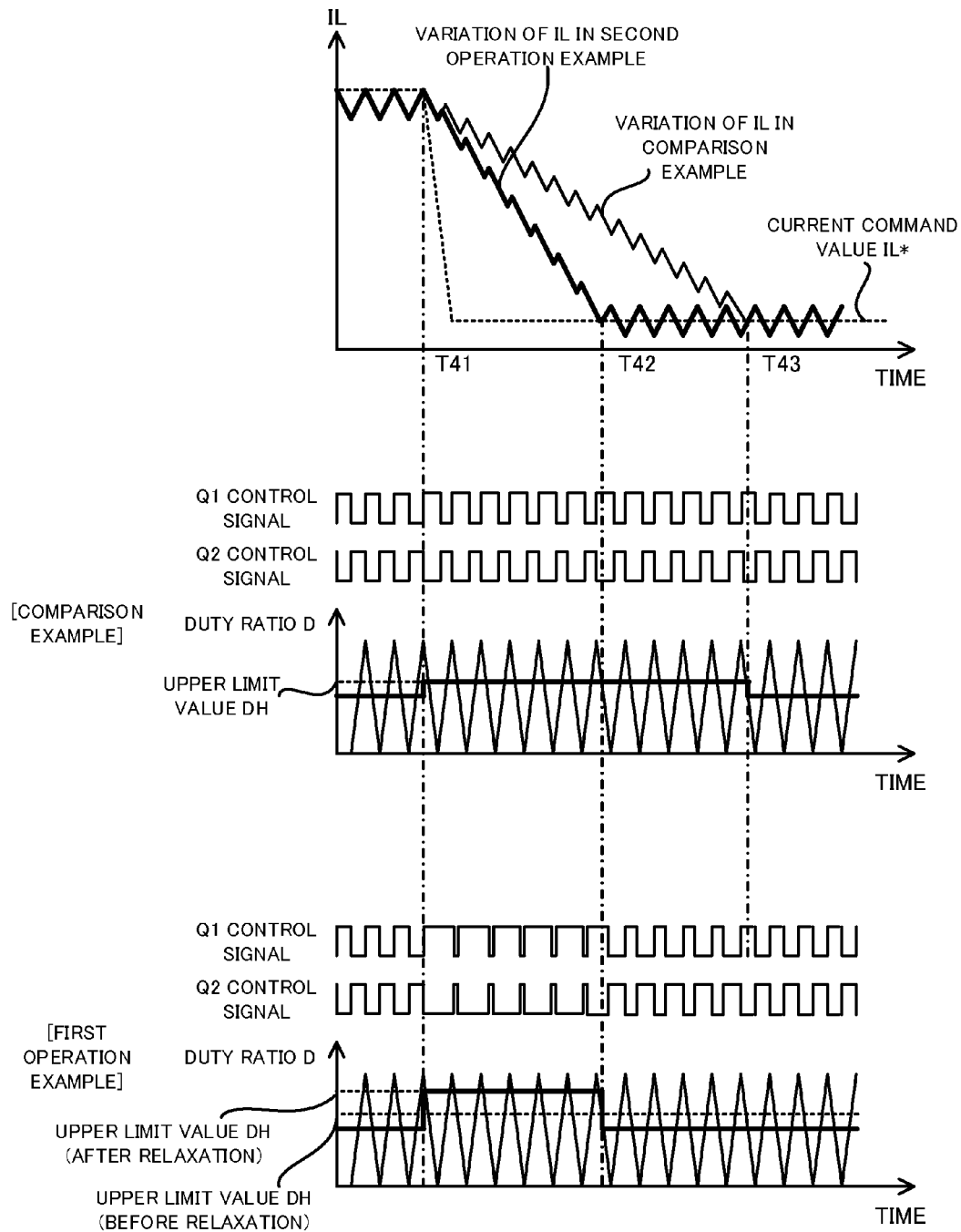

[FIG. 10]
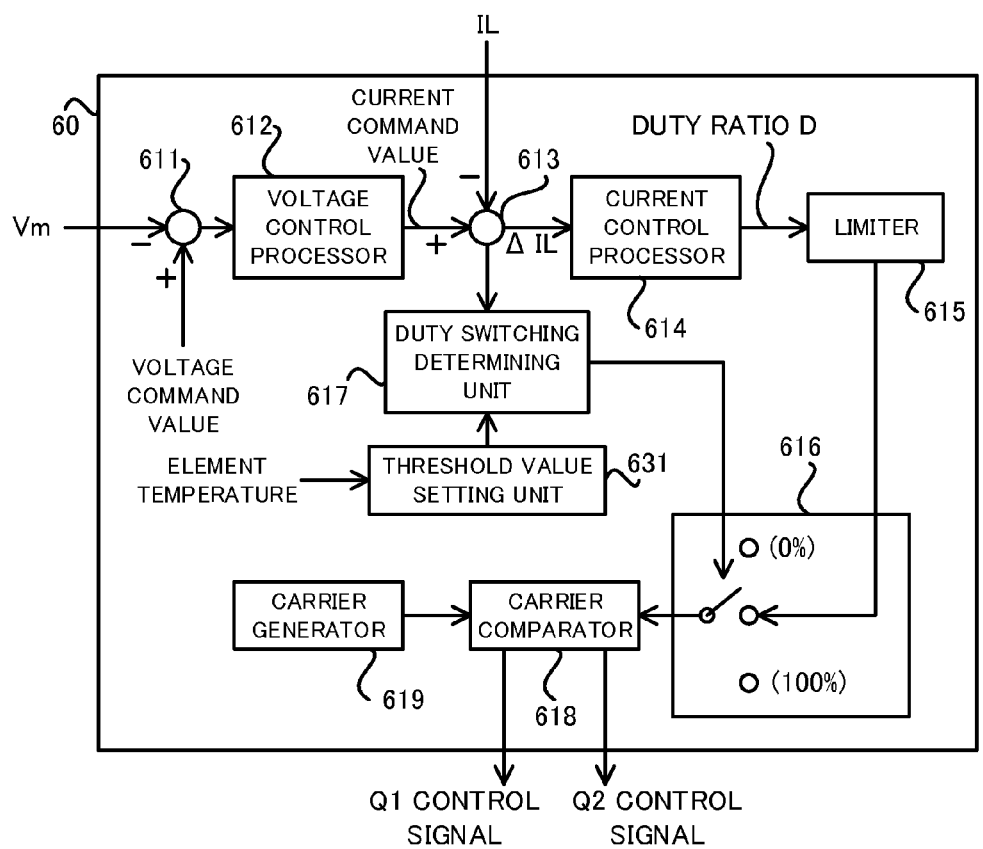

[FIG. 11]
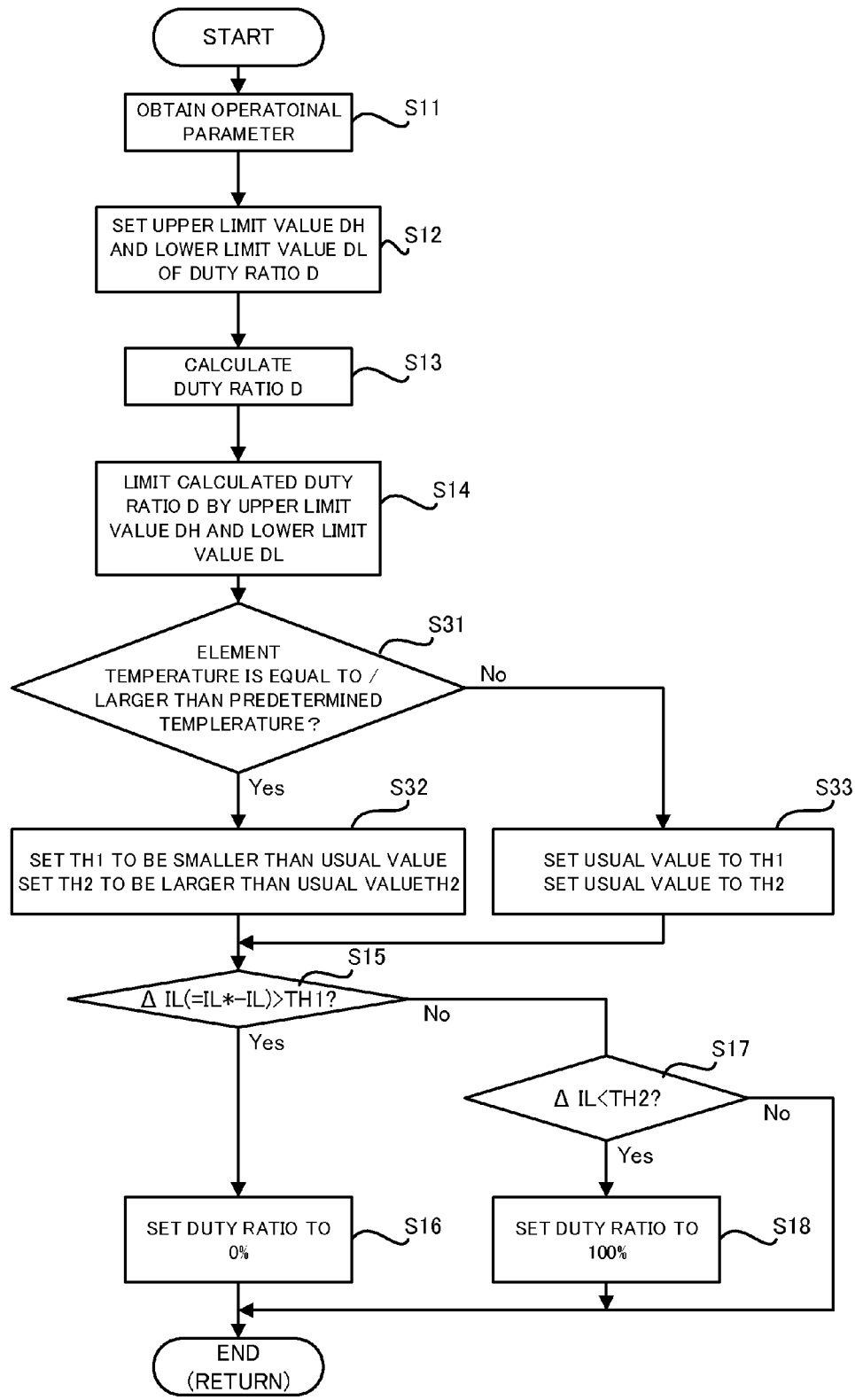

[FIG. 12]
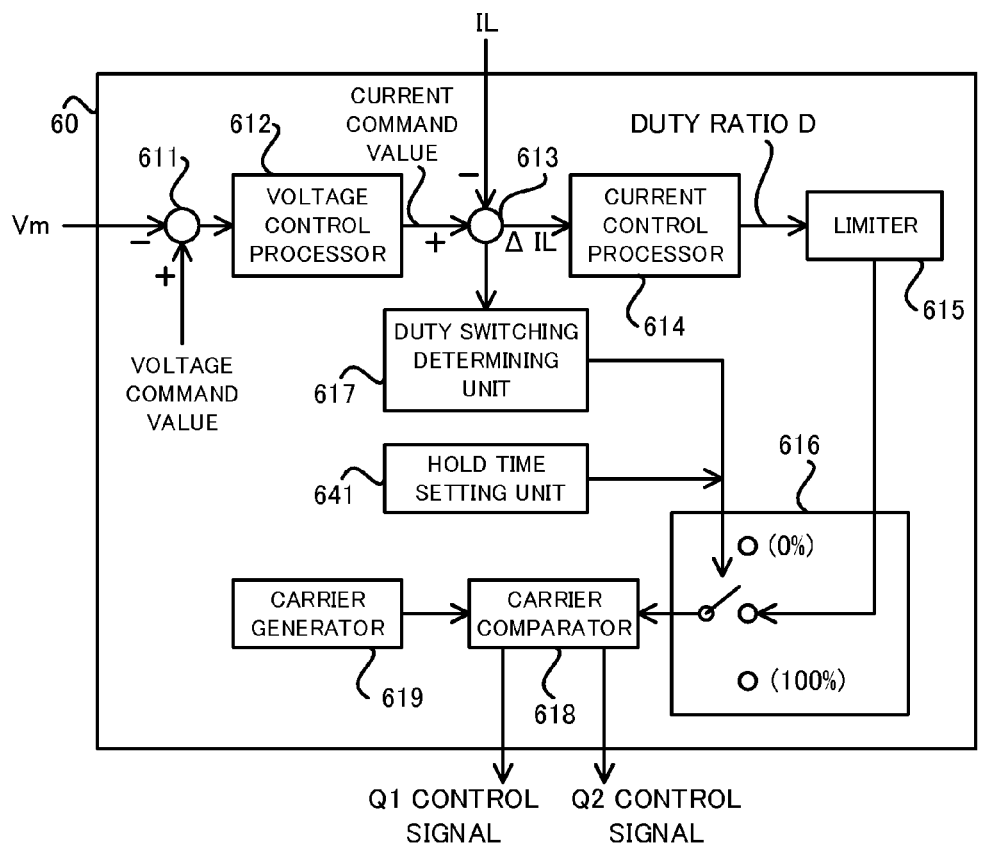

[FIG. 13]
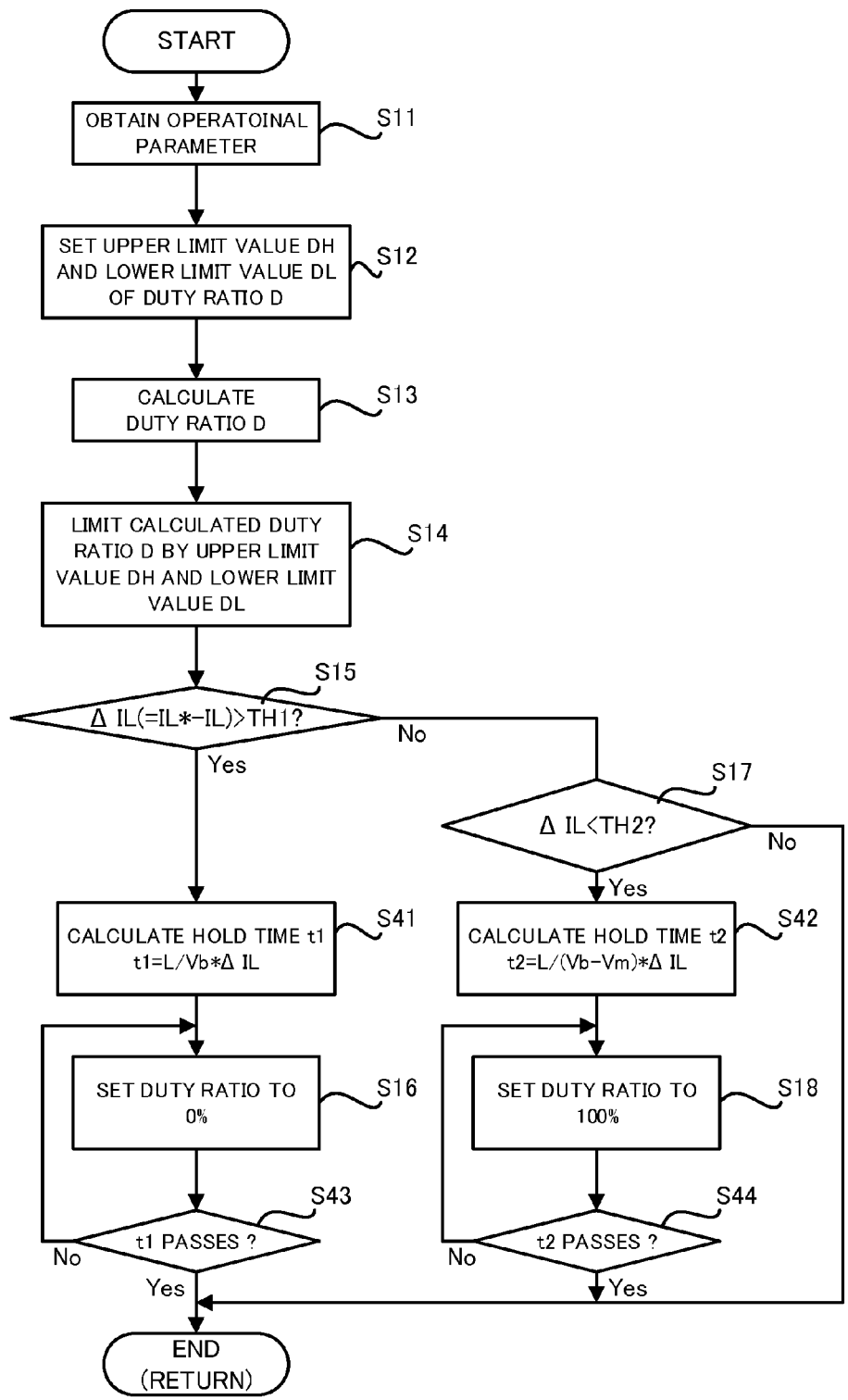

[FIG. 14]
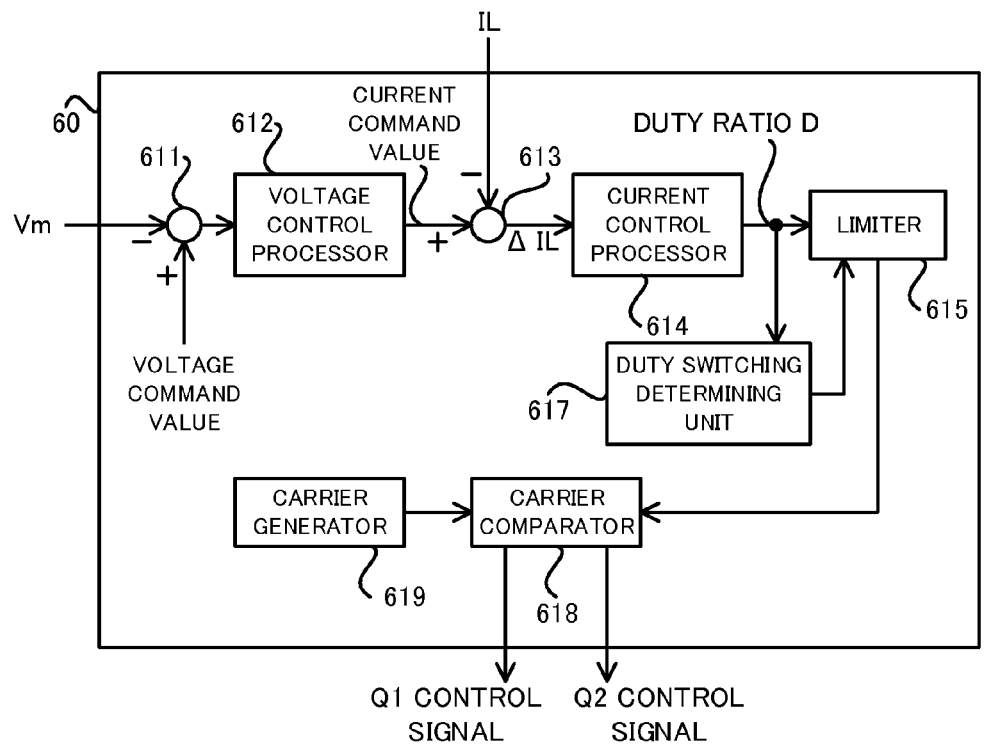

[FIG. 15]
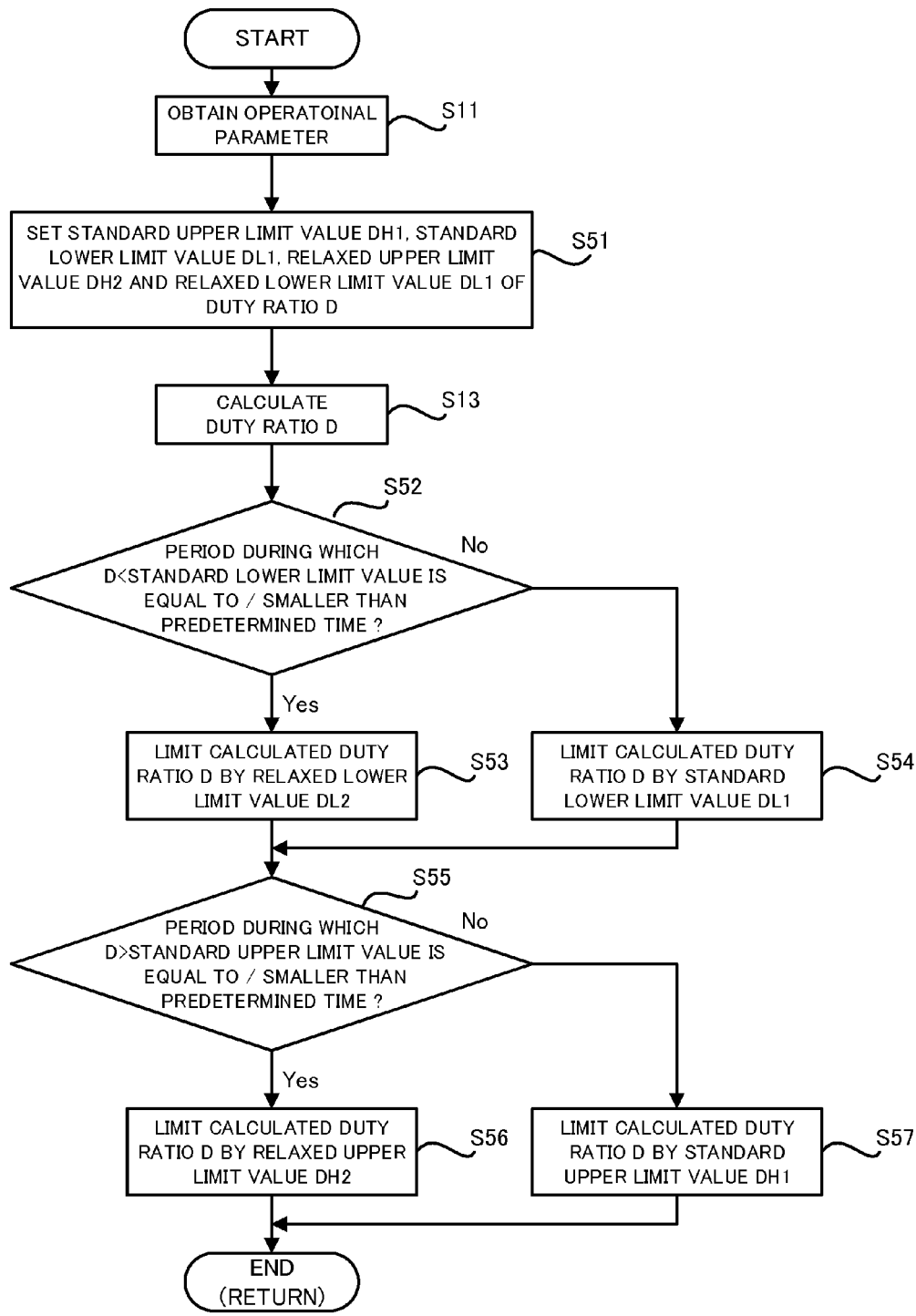

VOLTAGE CONVERSION CONTROL APPARATUS FOR A BOOST CONVERTER CONFIGURED TO BOOST OR STEP DOWN OUTPUT VOLTAGE OF AN ELECTRICITY STORAGE APPARATUS

CROSS-REFERENCE TO RELATED APPLICATIONS

This is a national phase application based on the PCT International Patent Application No. PCT/JP2013/076558 filed Sep. 30, 2013, claiming priority to Japanese Patent Application No. 2012-227387 filed Oct. 12, 2012, the entire contents of both of which are incorporated herein by reference.

TECHNICAL FIELD

The present invention relates to a voltage conversion control apparatus for controlling a voltage converter (for example, a boost converter) which converts an output voltage of an electricity storage apparatus, for example.

BACKGROUND ART

A hybrid vehicle which has both of an engine and a rotating electrical machine as a power source for moving is known. The hybrid vehicle like this has an electricity storage apparatus (in other words, an electrical power source or a battery) and a voltage converter which converts an output voltage of the electricity storage apparatus (for example, a booster converter which boosts or steps down the output voltage). When the output voltage is boosted by the voltage converter, the rotating electrical machine is driven by a relatively high voltage. Thus, a high power or a high efficiency (namely, a reduction of a loss) of the rotating electrical machine is achieved.

What we call a chopper type boost converter is often used as the voltage converter (for example, see Patent Literatures 1 to 3). Namely, a voltage converter in which an upper switching element at a high potential side and a lower switching element at a low potential side are connected in series is often used as the voltage converter.

Here, the Patent Literature 1 proposes a technology for setting a lower limit value of a duty ratio which represents a rate of a period during which the upper switching element is turned on (namely, the period during which the upper switching element is turned on/(the period during which the upper switching element is turned on+a period during which the lower switching element is turned on)) in order to maximize an electrical power which is outputted from the electricity storage apparatus via the voltage converter. Therefore, according to the technology which is disclosed in the Patent Literature 1 when the duty ratio which is calculated to convert the output voltage of the electricity storage apparatus into a desired voltage is lower than the lower limit value, the duty ratio which is actually used is limited to the lower limit value. Moreover, the Patent Literature 1 proposes a technology for setting an upper limit value of the duty ratio.

In addition, another example of the hybrid vehicle which has the voltage converter is disclosed in the Patent Literature 2 and the Patent Literature 3. Specifically, the Patent Literature 2 discloses a hybrid vehicle which greatly changes an output current of the electricity storage apparatus by changing the duty ratio more greatly than an aspect of changing the duty ratio from a duty ratio which depends on a first command value to a duty ratio which depends on a second command value, when the output current of the electricity storage apparatus is changed from the first command value to the second command value. Moreover, the Patent Literature 3 discloses a hybrid vehicle which changes the lower limit value of the duty ratio on the basis of a SOC (State Of Charge).

CITATION LIST

Patent Literature

[Patent Literature 1] Japanese Patent No. 3906843
[Patent Literature 2] Japanese Patent Application Laid Open No. 2008-172952
[Patent Literature 2] Japanese Patent Application Laid Open No. 2006-115635

SUMMARY OF INVENTION

Technical Problem

A smoothing condenser which compensates a difference between the electrical power which is outputted from the electricity storage apparatus via the voltage converter and an electrical power which is required by the rotating electrical machine is disposed between the voltage converter and the rotating electrical machine. Recently, a reduction of a capacitance of the smoothing condenser is studied to achieve a downsizing of the smoothing condenser. Reducing a delay of a response of the electrical power which is outputted from the electricity storage apparatus via the voltage converter with respect to the electrical power which is required by the rotating electrical machine (namely, decreasing the difference between the electrical power which is outputted from the electricity storage apparatus and the electrical power which is required by the rotating electrical machine) is regarded as one method to reduce the capacitance of the smoothing condenser. The reason is following: the larger the delay of the response of the electrical power which is outputted from the electricity storage apparatus with respect to the electrical power which is required by the rotating electrical machine is reduced is, the smaller the electrical power which the smoothing condenser should compensate (for example, the electrical power which the smoothing condenser should supply when the electricity storage apparatus discharges and the electrical power which should be stored in the smoothing condenser when the electricity storage apparatus is charged) is.

However, when the constant upper limit value and the constant lower limit value of the duty ratio of the voltage converter are set as described above, it is technically difficult to reduce the delay of the response of the electrical power which is outputted from the electricity storage apparatus. Specifically, when the constant upper limit value and the constant lower limit value of the duty ratio are set, a high response of the output current of the electricity storage apparatus is prevented. The reason is following: setting the lower limit value of the duty ratio results in a limitation of a period during which an ON state of the lower switching element which contributes an increase of the output current of the electricity storage apparatus is maintained and similarly setting the upper limit value of the duty ratio results in a limitation of a period during which an ON state of the upper switching element which contributes a decrease of the output current of the electricity storage apparatus is maintained. As a result, a large difference which is expected not to arise if the upper limit value and the lower limit value of the duty ratio are not set arises between the electrical power which is outputted from the electricity storage apparatus and the electrical power which is required by the rotating electrical machine. This state arises significantly especially at a transient period during which the output current of the electricity storage apparatus is being changed to the target value.

The above described problem is listed as one example of the problem which the present invention tries to solve. It is a problem of the present invention to provide, for example, a voltage conversion control apparatus which is capable of achieving the high response of the output current of the electricity storage apparatus.

Solution to Problem

<1>

In order to solve the above described problem, an voltage conversion control apparatus of the present invention is a control apparatus which controls a voltage converter, the voltage converter is capable of converting an output voltage of an electricity storage apparatus and has an upper switching element at a high potential side and a lower switching element at a low potential side which are connected in series, the voltage conversion control apparatus has: a calculating device which calculates a duty ratio such that an output current of the electricity storage apparatus reaches a target value and the duty ratio is within a predetermined allowable range, wherein the duty ratio represents a rate of a period during which the upper switching element in turned on; a limit relaxing device which relaxes at least one of an upper limit value and a lower limit value of the allowable range on the basis of a magnitude relationship between a predetermined threshold value and a current deviation which is obtained by subtracting the output current from the target value; and a controlling device which controls the upper switching element and the lower switching element to perform a switching control on the basis of the duty ratio which is calculated by the calculating device.

According to the voltage converter control apparatus of the present invention, the voltage converter is controlled. Incidentally, the voltage converter converts the output voltage of the electricity storage apparatus (in other words, an electrical power source or a battery). More specifically, the voltage converter boosts or steps down the output voltage of the electricity storage apparatus. In the present invention, the voltage converter has the upper switching element and the lower switching element which are connected in series, in order to convert the output voltage of the electricity storage apparatus. The upper switching element constitutes a circuit portion at the higher potential side than a voltage at a circuit portion which the lower switching element constitutes. On the other hand, the lower switching element constitutes the circuit portion at the lower potential side than a voltage at the circuit portion which the upper switching element constitutes. Namely, the voltage converter is what we call a chopper type voltage converter.

The voltage converter control apparatus has the calculating device, the limit relaxing device and the controlling device, in order to control the above described voltage converter.

The calculating device calculates the duty ratio which represents a rate of a period during which the upper switching element in turned on (namely, the period during which the upper switching element is turned on/(the period during which the upper switching element is turned on+a period during which the lower switching element is turned on)).

In this case, the calculating device calculates the duty ratio such that the output current of the electricity storage apparatus reaches the target value (namely, becomes equal to or follows). Incidentally, the target value of the output current may be calculated in a viewpoint to makes the output voltage of the voltage converter (namely, a voltage obtained by converting the output voltage of the electricity converter) become equal to a load voltage which is required by a load such as a rotating electrical machine or the like, for example. Alternatively, the target value of the output current may be calculated in a viewpoint to reduce or eliminate a difference between an electrical power which is outputted from the electricity storage apparatus via the voltage converter (namely, the voltage which is outputted from the voltage converter) and an electrical power which is required by the load such as the rotating electrical machine or the like, for example. However, the target value of the output current may be calculated in another viewpoint.

Moreover, the calculating device calculates the duty ratio such that the duty ratio is within the predetermined allowable range. For example, when the duty ratio, which is calculated in the viewpoint to make the output current of the electricity storage apparatus reach the target value, is smaller than the lower limit value of the allowable range, the calculating device uses any duty ratio which is equal to or larger than the lower limit value of the allowable range instead of the calculated duty ratio. Alternatively, for example, when the duty ratio, which is calculated in the viewpoint to make the output current of the electricity storage apparatus reach the target value, is larger than the upper limit value of the allowable range, the calculating device uses any duty ratio which is equal to or smaller than the upper limit value of the allowable range instead of the calculated duty ratio. On the other hand, for example, when the duty ratio, which is calculated in the viewpoint to make the output current of the electricity storage apparatus reach the target value, is within the allowable range, the calculating device directly uses the calculated duty ratio as it is. Incidentally, the allowable range of the duty ratio may be set in a viewpoint to maximize the electrical power which is outputted from the electricity storage apparatus via the voltage converter. However, the allowable range of the duty ratio may be calculated in another viewpoint.

Incidentally, a sum of the rate of the period during which the upper switching element is turned on and a rate of a period during which the lower switching element is turned on (namely, the period during which the lower switching element is turned on/(the period during which the upper switching element is turned on+the period during which the lower switching element is turned on)) is 100%. Therefore, the calculation of the duty ratio which represents the rate of the period during which the upper switching element in turned on can be substantially regarded as a calculation of the duty ratio which represents the rate of the period during which the lower switching element in turned on. Therefore, the calculating device may indirectly calculate the duty ratio which represents the rate of the period during which the upper switching element in turned on by calculating the duty ratio which represents the rate of the period during which the lower switching element in turned on, instead of or in addition to directly calculating the duty ratio which represents the rate of the period during which the upper switching element in turned on.

The limit relaxing device relaxes at least one of the upper limit value and the lower limit value of the allowable range (namely, the allowable range of the duty ratio) which the calculating device uses. Namely, the limit relaxing device relaxes the allowable range itself which the calculating device uses. Incidentally, the "relaxing" herein typically means an expansion of the allowable range (namely, an operation of loosing/erasing the limitation). The relaxation of the allowable range is typically achieved by an operation of increasing the upper limit value and decreasing the lower limit value.

Especially, the limit relaxing device relaxes at least one of the upper limit value and the lower limit value on the basis of the magnitude relationship between the predetermined threshold value and the current deviation. Namely, the limit relaxing device relaxes at least one of the upper limit value and the lower limit value, when the magnitude relationship between the predetermined threshold value and the current deviation satisfies a predetermined condition. For example, as described later, it is preferable that the limit relaxing device relax at least one of the upper limit value and the lower limit value at a transient period during which the output current is greatly different from the target value (namely, an absolute value of the current deviation is larger than the predetermined threshold value). On the other hand, it is preferable that the limit relaxing device not relax at least one of the upper limit value and the lower limit value, when the magnitude relationship between the predetermined threshold value and the current deviation does not satisfy the predetermined condition. For example, as described later, it is preferable that the limit relaxing device not relax at least one of the upper limit value and the lower limit value at a static (steady) period during which the output current is not greatly different from the target value (namely, the absolute value of the current deviation is equal to or smaller than the predetermined threshold value). The reason is following: an unlimited relaxation of at least one of the upper limit value and the lower limit value may undermine a technical effect of the maximization of the electrical power which is outputted from the electricity storage apparatus via the voltage converter.

Incidentally, the current deviation corresponds to a value which is obtained by subtracting the output current (namely, an actual output current) from the target value (namely, the target value of the output current). However, the value which is obtained by subtracting the output current from the target value and a value which is obtained by subtracting the target value from the output current have such a relationship that their absolute values are same to each other and their signs are opposite to each other. Therefore, the value which is obtained by subtracting the output current from the target value and the value which is obtained by subtracting the target value from the output current can be used equivalently, from a viewpoint of the difference (deviation). Therefore, the limit relaxing device may use, as one example of the current deviation (what we call, a value which directly represents the current deviation), the value which is obtained by subtracting the output current from the target value. Alternatively, the limit relaxing device may use, as one example of the current deviation (what we call, a value which indirectly represents the current deviation), the value which is obtained by subtracting the target value from the output current.

When at least one of the upper limit value and the lower limit value is relaxed by the limit relaxing device as described above, the calculating device calculates the duty ratio such that the duty ratio is within the allowable range which is defined by at least one of the upper limit value and the lower limit value which is relaxed (namely, the relaxed allowable range). On the other hand, when at least one of the upper limit value and the lower limit value is not relaxed by the limit relaxing device as described above, the calculating device calculates the duty ratio such that the duty ratio is within the allowable range which is defined by at least one of the upper limit value and the lower limit value which is not relaxed (namely, the default allowable range).

The controlling device controls the upper switching element and the lower switching element to perform the switching control on the basis of the duty ratio which is calculated by the calculating device. Namely, the controlling device makes the upper switching element be in the ON state and simultaneously makes the lower switching element be in the OFF state during a period which is based on the duty ratio calculated by the calculating device, and makes the lower switching element be in the ON state and simultaneously makes the upper switching element be in the OFF state during another period. As a result, the output current of the electricity storage apparatus reaches the target value and the output voltage of the electricity storage apparatus is converted into a predetermined voltage. As a result, the electrical power which is outputted from the electricity storage apparatus via the voltage converter becomes equal to the electrical power which is required by the load such as the rotating electrical machine or the like.

As described above, in the present invention, the allowable range of the duty ratio is relaxed by the limit relaxing device. Thus, in the present invention, a technical effect which is explained below can be achieved.

Specifically, for example, the duty ratio which is calculated in the case where the upper limit value is relaxed could be larger than that in the case where the upper limit value is not relaxed. Since the duty ratio is larger, the period during which the upper limit switching element is turned on in the case where the upper limit value is relaxed is longer than that in the case where the upper limit value is not relaxed. Since the period during which the upper limit switching element is turned on is longer, when the upper limit value is relaxed, it is possible to decrease the output current of the electricity storage apparatus more rapidly than that in the case where the upper limit value is not relaxed. Namely, when the upper limit value is relaxed, a time which is required for the output current of the electricity storage apparatus to reach the target value which is smaller than the output current can be shortened, compared to the case where the upper limit value is not relaxed. Namely, when the upper limit value is relaxed, a high response of the output current of the electricity storage apparatus can be achieved, compared to the case where the upper limit value is not relaxed.

Similarly, for example, the duty ratio which is calculated in the case where the lower limit value is relaxed could be smaller than that in the case where the lower limit value is not relaxed. Since the duty ratio is smaller, the period during which the lower limit switching element is turned on in the case where the lower limit value is relaxed is longer than that in the case where the lower limit value is not relaxed. Since the period during which the lower limit switching element is turned on is longer, when the lower limit value is relaxed, it is possible to increase the output current of the electricity storage apparatus more rapidly than that in the case where the lower limit value is not relaxed. Namely, when the lower limit value is relaxed, a time which is required for the output current of the electricity storage apparatus to reach the target value which is larger than the output current can be shortened, compared to the case where the lower limit value is not relaxed. Namely, when the lower limit value is relaxed, the high response of the output current of the electricity storage apparatus can be achieved, compared to the case where the lower limit value is not relaxed.

The above described high response of the output current of the electricity storage apparatus results in a reduction of a difference between the electrical power which is required by the load such as the rotating electrical machine or the like and the electrical power which is outputted from the electricity storage apparatus via the voltage converter. The reduction of the difference between the electrical power which is required by the load such as the rotating electrical machine or the like and the electrical power which is outputted from the electricity storage apparatus via the voltage converter results in a reduction of a capacitance of a smoothing condenser which is disposed between the voltage converter and the load. Therefore, it is possible to reduce a size of the smoothing condenser more by the reduction of the capacitance of the smoothing condenser.

In addition, in the present invention, the allowable range of the duty ratio is relaxed selectively when the magnitude relationship between the current deviation and the predetermined threshold value satisfies the predetermined condition. For example, as described later, the allowable range of the duty ratio is selectively relaxed at the transient period during which the output current is greatly different from the target value (namely, the absolute value of the current deviation is larger than the predetermined threshold value). Generally, the transient period is often a period which is greatly shorter than the static period during which the output current is not greatly different from the target value. Namely, the period during which the relaxation of the allowable range of the duty ratio may possibly undermine the maximization of the electrical power which is outputted from the electricity storage apparatus via the voltage converter is actually very short. Therefore, even if the allowable range of the duty ratio is relaxed at the transient period, there is less or no adverse effect on the operation of the voltage converter. In the present invention, the high response of the output current of the electricity storage apparatus (as a result, the high response of the electrical power which is outputted from the electricity storage apparatus via the voltage converter) is prioritized over the maximization of the electrical power which is outputted from the electricity storage apparatus via the voltage converter at the transient period during which the output current of the electricity storage apparatus and the electrical power which is outputted from the electricity storage apparatus via the voltage converter easily vary greatly, compared to the static period during which the output current of the electricity storage apparatus and the electrical power which is outputted from the electricity storage apparatus via the voltage converter do not easily vary greatly. Namely, in the present invention, the voltage converter is controlled in an aspect which is suitable for each period while distinguishing the technical effect which should be important at the transient period and the technical effect which should be important at the static period. Therefore, it is possible to appropriately achieve the "high response of the output current" which is caused by the relaxation of the allowable range of the duty ratio while appropriately achieving the "maximization of the electrical power which is outputted from the electricity storage apparatus via the voltage converter" which is caused by making the duty ratio be within the allowable range.

Incidentally, in the above described Patent Literatures 1 to 3, the allowable range which is calculated in the viewpoint to achieve the maximization of the electrical power which is outputted from the electricity storage apparatus via the voltage converter is not relaxed temporarily or permanently. Namely, in the above described Patent Literatures 1 to 3, the voltage converter is merely controlled on the basis of the duty ratio which is within the allowable range which is calculated in the viewpoint to achieve the maximization of the electrical power which is outputted from the electricity storage apparatus via the voltage converter. Therefore, the delay of the response time of the output current of the electricity storage apparatus, which does not easily present a problem at the static period, arises at the transient period significantly. However, as described above, the present invention is very useful, because it is possible to appropriately achieve the "high response of the output current" which is caused by the relaxation of the allowable range of the duty ratio at the transient period while appropriately achieving the "maximization of the electrical power which is outputted from the electricity storage apparatus via the voltage converter" which is caused by making the duty ratio be within the allowable range at the static period.

<2>

In another aspect of the voltage conversion control apparatus of the present invention, when the current deviation is larger than a first threshold value (incidentally, the first threshold value is a positive value), the limit relaxing device makes the lower limit value smaller than the case where the current deviation is equal to or smaller than the first threshold value.

According to this aspect, the limit relaxing device is capable of relaxing the lower limit value at the transient period during which the current deviation (=target value−output current) is larger than the first threshold value (namely, the output current is greatly different from the target value). In this case, since the output current is greatly different from the target value, smaller duty ratio (for example, the duty ratio which becomes equal to the lower limit value which becomes smaller) is often calculated in order to rapidly increase the output current of the electricity storage apparatus to reach the target value which is larger than the output current. As a result, when the lower limit value is relaxed, the time which is required for the output current of the electricity storage apparatus to reach the target value which is larger than the output current can be shortened, compared to the case where the lower limit value is not relaxed. Therefore, the high response of the output current of the electricity storage apparatus can be achieved as described above.

Incidentally, the limit relaxing device may determine whether or not the "value (=target value−output current) which directly represents the current deviation" is larger than the "first threshold value" by determining whether or not the "value (=output current−target value) which indirectly represents the current deviation" is smaller than the "−first threshold value".

<3>

In another aspect of the voltage conversion control apparatus of the present invention, when the current deviation is larger than a first threshold value (incidentally, the first threshold value is a positive value), the limit relaxing device sets 0% to the lower limit value.

According to this aspect, the limit relaxing device sets 0% to the lower limit value at the transient period during which the current deviation (=target value−output current) is larger than the first threshold value (namely, the output current is greatly different from the target value). In this case, since the output current is greatly different from the target value, the duty ratio which is 0% is often calculated in order to rapidly increase the output current of the electricity storage apparatus to reach the target value which is larger than the output current. As a result, the upper switching element is always in the OFF state and the lower switching element is always in the ON state. Therefore, in this aspect, the time which is required for the output current of the electricity storage apparatus to reach the target value which is larger than the output current can be shortened as much as possible. Namely, it is possible to improve the responsibility of the output current of the electricity storage apparatus to a limit which is defined by a specification of a hardware such as the voltage converter, the electricity storage apparatus and the like. Therefore, the high response of the output current of the electricity storage apparatus can be achieved as described above.

<4>

In another aspect of the voltage conversion control apparatus of the present invention, when the current deviation is smaller than a second threshold value (incidentally, the second threshold value is a negative value), the limit relaxing device makes the upper limit value larger than the case where the current deviation is equal to or larger than the second threshold value.

According to this aspect, the limit relaxing device is capable of relaxing the upper limit value at the transient period during which the current deviation (=target value−output current) is smaller than the second threshold value (namely, the output current is greatly different from the target value). In this case, since the output current is greatly different from the target value, larger duty ratio (for example, the duty ratio which becomes equal to the upper limit value which becomes larger) is often calculated in order to rapidly decrease the output current of the electricity storage apparatus to reach the target value which is smaller than the output current. As a result, when the upper limit value is relaxed, the time which is required for the output current of the electricity storage apparatus to reach the target value which is smaller than the output current can be shortened, compared to the case where the upper limit value is not relaxed. Therefore, the high response of the output current of the electricity storage apparatus can be achieved as described above.

Incidentally, the limit relaxing device may determine whether or not the "value (=target value−output current) which directly represents the current deviation" is smaller than the "second threshold value" by determining whether or not the "value (=output current−target value) which indirectly represents the current deviation" is larger than the "−second threshold value".

<5>

In another aspect of the voltage conversion control apparatus of the present invention, when the current deviation is smaller than a second threshold value (incidentally, the second threshold value is a negative value), the limit relaxing device sets 100% to the upper limit value.

According to this aspect, the limit relaxing device sets 100% to the upper limit value at the transient period during which the current deviation (=target value−output current) is smaller than the second threshold value (namely, the output current is greatly different from the target value). In this case, since the output current is greatly different from the target value, the duty ratio which is 100% is often calculated in order to rapidly decrease the output current of the electricity storage apparatus to reach the target value which is smaller than the output current. As a result, the upper switching element is always in the ON state and the lower switching element is always in the OFF state. Therefore, in this aspect, the time which is required for the output current of the electricity storage apparatus to reach the target value which is smaller than the output current can be shortened as much as possible. Namely, it is possible to improve the responsibility of the output current of the electricity storage apparatus to the limit which is defined by the specification of the hardware such as the voltage converter, the electricity storage apparatus and the like. Therefore, the high response of the output current of the electricity storage apparatus can be achieved as described above.

<6>

In another aspect of the voltage conversion control apparatus of the present invention, the limit relaxing device changes the predetermined threshold value on the basis of an element temperature of at least one of the upper switching element and the lower switching element.

According to this aspect, as described later, the element temperature of at least one of the upper switching element and the lower switching element and an increase of the element temperature are suppressed.

<7>

In another aspect of the above described voltage conversion control apparatus which changes the predetermined threshold value on the basis of the element temperature, when the current deviation is larger than a first threshold value (incidentally, the first threshold value is a positive value), the limit relaxing device relaxes the lower limit value, compared to the case where the current deviation is equal to or smaller than the first threshold value, the limit relaxing device changes the first threshold value such that the first threshold value in the case where the element temperature is larger than a predetermined temperature is smaller than the first threshold value in the case where the element temperature is equal to or smaller than the predetermined temperature.

According to this aspect, when the element temperature is larger than the predetermined temperature, it is determined that the current deviation is larger than the first threshold value more often than the case where the element temperature is equal to or smaller than the predetermined temperature, because the first threshold value becomes smaller. As a result, when the element temperature is larger than the predetermined temperature, the lower limit value can be easily relaxed, compared to the case where the element temperature is equal to or smaller than the predetermined temperature. The relaxation of the lower limit value results in the calculation of the smaller duty ratio (for example, the duty ratio which becomes equal to the lower limit value which becomes smaller). As a result, the number of the switching of the upper switching element and the lower switching element is reduced. Especially, when the duty ratio is 0%, the switching of the upper switching element and the lower switching element is not substantially or absolutely performed. Therefore, the increase of the element temperature of at least one of the upper switching element and the lower switching element is suppressed, because the switching which may cause a heat generation of the upper switching element and the lower switching element is prevented.

<8>

In another aspect of the above described voltage conversion control apparatus which changes the predetermined threshold value on the basis of the element temperature, when the current deviation is smaller than a second threshold value (incidentally, the second threshold value is a negative value), the limit relaxing device relaxes the upper limit value, compared to the case where the current deviation is equal to or larger than the second threshold value, the limit relaxing device changes the second threshold value such that the second threshold value in the case where the element temperature is larger than a predetermined temperature is larger than the second threshold value in the case where the element temperature is equal to or smaller than the predetermined temperature.

According to this aspect, when the element temperature is larger than the predetermined temperature, it is determined that the current deviation is smaller than the second threshold value more often than the case where the element temperature is equal to or smaller than the predetermined temperature, because the second threshold value becomes larger. As a result, when the element temperature is larger than the predetermined temperature, the upper limit value can be easily relaxed, compared to the case where the element temperature is equal to or smaller than the predetermined temperature. The relaxation of the upper limit value results in the calculation of the larger duty ratio (for example, the duty ratio which becomes equal to the upper limit value which becomes larger). As a result, the number of the switching of the upper switching element and the lower switching element is reduced. Especially, when the duty ratio is 100%, the switching of the upper switching element and the lower switching element is not substantially or absolutely performed. Therefore, the increasing of the element temperature of at least one of the upper switching element and the lower switching element is suppressed, because the switching which may cause the heat generation of the upper switching element and the lower switching element is prevented.

<9>

In another aspect of the voltage conversion control apparatus of the present invention, the controlling device controls the upper switching element and the lower switching element to perform the switching control on the basis of the duty ratio which is within the allowable range which is relaxed by the limit relaxing device until a period which is required for the output current to reach the target value passes.

According to this aspect, it is possible to minimize a period during which the switching control is performed on the basis of the duty ratio which is calculated to be within the relaxed allowable range. In addition, the output current is capable of reaching the target value at a desired timing, when the switching control, which is performed on the basis of the duty ratio which is calculated to be within the relaxed allowable range, starts on the basis of a back calculation from the time which is required for the output current to reach the target value.

<10>

In another aspect of the voltage conversion control apparatus of the present invention, the limit relaxing device relaxes at least one of the upper limit value and the lower limit value on the basis of an elapsed period after the duty ratio which is calculated by the calculating device without the allowable range being considered starts to be beyond the not-relaxed allowable range.

According to this aspect, the limit relaxing device is capable of indirectly determining the magnitude relationship between the current deviation and the predetermined threshold value on the basis of the elapsed period after the duty ratio which is calculated by the calculating device without the allowable range being considered starts to be beyond the not-relaxed allowable range. The reason is following: a state where the duty ratio which is calculated by the calculating device without the allowable range being considered is beyond the not-relaxed allowable range arises more easily at the transient period during which the output current is greatly different from the target value (namely, the absolute value of the current deviation is larger than the predetermined threshold value). Namely, the elapsed period after the duty ratio which is calculated by the calculating device without the allowable range being considered starts to be beyond the not-relaxed allowable range may overlap with the period during which the output current is greatly different from the target value (namely, the absolute value of the current deviation is larger than the predetermined threshold value). Therefore, the limit relaxing device is capable of relaxing at least one of the upper limit value and the lower limit value in the above described manner without directly recognizing the magnitude relationship between the current deviation and the predetermined threshold value.

<11>

In another aspect of the above described voltage conversion control apparatus which relaxes at least one of the upper limit value and the lower limit value on the basis of the period after the duty ratio which is calculated by the calculating device without the allowable range being considered starts to be beyond the allowable range, the limit relaxing device relaxes the lower limit value, when an elapsed period after the duty ratio which is calculated by the calculating device without the allowable range being considered starts to be smaller than the not-relaxed lower limit value is equal to or smaller than a predetermined period.

According to this aspect, the elapsed period after the duty ratio which is calculated by the calculating device without the allowable range being considered starts to be smaller than the not-relaxed lower limit value is equal to or smaller than the predetermined period, it is predicted that the relaxation of the lower limit value does not continue over so long time. Therefore, it is predicted that there is a relatively high possibility of the continuation of the state where the output current is greatly different from the target value. Therefore, in this case, the limit relaxing device relaxes the lower limit value.

On the other hand, the elapsed period after the duty ratio which is calculated by the calculating device without the allowable range being considered starts to be smaller than the not-relaxed lower limit value is larger than the predetermined period, it is predicted that the relaxation of the lower limit value continues over a relatively long time. Therefore, it is predicted that there is a relatively high possibility of the resolution of the state where the output current is greatly different from the target value due to the relaxation of the lower limit value. Therefore, in this case, the limit relaxing device does not necessarily relax the lower limit value.

<12>

In another aspect of the above described voltage conversion control apparatus which relaxes at least one of the upper limit value and the lower limit value on the basis of the period after the duty ratio which is calculated by the calculating device without the allowable range being considered starts to be beyond the allowable range, the limit relaxing device relaxes the upper limit value, when an elapsed period after the duty ratio which is calculated by the calculating device without the allowable range being considered starts to be larger than the not-relaxed upper limit value is equal to or smaller than a predetermined period.

According to this aspect, the elapsed period after the duty ratio which is calculated by the calculating device without the allowable range being considered starts to be larger than the not-relaxed upper limit value is equal to or smaller than the predetermined period, it is predicted that the relaxation of the upper limit value does not continue over so long time.

Therefore, it is predicted that there is a relatively high possibility of the continuation of the state where the output current is greatly different from the target value. Therefore, in this case, the limit relaxing device relaxes the upper limit value.

On the other hand, the elapsed period after the duty ratio which is calculated by the calculating device without the allowable range being considered starts to be larger than the not-relaxed upper limit value is larger than the predetermined period, it is predicted that the relaxation of the upper limit value continues over a relatively long time. Therefore, it is predicted that there is a relatively high possibility of the resolution of the state where the output current is greatly different from the target value due to the relaxation of the upper limit value. Therefore, in this case, the limit relaxing device does not necessarily relax the upper limit value.

The operation and other advantages of the present invention will become more apparent from embodiments explained below.

BRIEF DESCRIPTION OF DRAWINGS

FIG. 1 is a block diagram illustrating one example of the structure of the hybrid vehicle of the present embodiment FIG. 2 is a block diagram which illustrates an inner structure of the ECU which performs the first operation example.

FIG. 3 is a flowchart which illustrates a flow of the first operation example of the voltage conversion operation of the boost converter.

FIG. 4 is a graph which illustrates the responsibility of the source current in the first operation example in which the duty ratio is set to 0% and the responsibility of the source current in the comparison example in which the duty ratio is not set to 0%.

FIG. 5 is a graph which illustrates the responsibility of the source current in the first operation example in which the duty ratio is set to 100% and the responsibility of the source current in the comparison example in which the duty ratio is not set to 100%.

FIG. 6 is a block diagram which illustrates an inner structure of the ECU which performs the second operation example.

FIG. 7 is a flowchart which illustrates a flow of the second operation example of the voltage conversion operation of the boost converter.

FIG. 8 is a graph which illustrates the responsibility of the source current in the second operation example in which the lower limit value is relaxed and the responsibility of the source current in the comparison example in which the lower limit value is not relaxed.

FIG. 9 is a graph which illustrates the responsibility of the source current in the second operation example in which the upper limit value is relaxed and the responsibility of the source current in the comparison example in which the upper limit value is not relaxed.

FIG. 10 is a block diagram which illustrates an inner structure of the ECU which performs the third operation example.

FIG. 11 is a flowchart which illustrates a flow of the third operation example of the voltage conversion operation of the boost converter.

FIG. 12 is a block diagram which illustrates an inner structure of the ECU which performs the fourth operation example.

FIG. 13 is a flowchart which illustrates a flow of the fourth operation example of the voltage conversion operation of the boost converter.

FIG. 14 is a block diagram which illustrates an inner structure of the ECU which performs the fifth operation example.

FIG. 15 is a flowchart which illustrates a flow of the fifth operation example of the voltage conversion operation of the boost converter.

DESCRIPTION OF EMBODIMENTS

Hereinafter, one example of an embodiment will be explained, with reference to the drawings.

(1) Structure of Hybrid Vehicle

Firstly, with reference to FIG. 1, a structure of a hybrid vehicle 100 of the present embodiment will be explained. Here, FIG. 1 is a block diagram illustrating one example of the structure of the hybrid vehicle 100 of the present embodiment.

As illustrated in FIG. 1, the hybrid vehicle 100 has a wheel 2, a power dividing mechanism 3, an engine 4, a motor generator MG1 and a motor generator MG2. Moreover, the hybrid vehicle 100 further has an electricity storage apparatus B, a boost converter 10 which is one example of the "voltage converter", an inverter 20, an inverter 30, a condenser C1, a condenser C2, a power source line PL1, a power source line PL2, a ground line SL and an ECU (Electronic Control Unit) 60.

The power dividing mechanism 3 is coupled with the engine 4, the motor generator MG1 and the motor generator MG2. The power dividing mechanism 3 distributes the power among the engine 4, the motor generator MG1 and the motor generator MG2. For example, the power dividing mechanism 3 is a planetary gear train having three rotating shafts of a sun gear, a planetary carrier and a ring gear. The rotating shaft of the sun gear which is located at an inner circumference is coupled with the motor generator MG1 and the rotating shaft of the ring gear which is located at an outer circumference is coupled with the motor generator MG2 among these gears. The rotating shaft of the planetary carrier which is located between the sun gear and the ring gear is coupled with the engine 4. A rotation of the engine 4 is transmitted to the sun gear and the ring gear by this planetary carrier and moreover a pinion gear. As a result, the power of the engine 4 is divided into two channels. In the hybrid vehicle 100, the rotating shaft of the ring gear is coupled with the axle shaft of the hybrid vehicle 100 and a driving power is transmitted to the wheel 2 via the axle shaft.

The motor generator MG1 is one example of the "rotating electrical machine", and functions as a generator for charging the electricity storage apparatus B or for supplying an electrical power to the motor generator MG2, and moreover functions as a motor for assisting the driving power of the engine 4. In addition, the motor generator MG1 functions as a motor which is capable of starting up the engine 4 under the control of the ECU 60.

The motor generator MG2 is one example of the "rotating electrical machine", and functions as the motor for assisting the power of the engine 4 or as the generator for charging the electricity storage apparatus B.

The electricity storage apparatus B is a DC (Direct Current) electricity storage apparatus which can be charged and can discharge, and includes a secondary battery (namely, a rechargeable battery) such as a nickel hydride battery, a lithium ion battery or the like. The electricity storage apparatus B supplies a DC electrical power to the power source PL1. Moreover, the electricity storage apparatus B is charged by receiving the DC electrical power which is outputted from the boost converter 10 to the power source line PL1.

Incidentally, the electricity storage apparatus B may be charged by receiving the electrical power from an electricity storage apparatus which is at an outside of the hybrid vehicle 100. Namely, the hybrid vehicle 100 may be what we call a plug-in hybrid vehicle.

The condenser C1 is connected between the power source line PL1 and the ground line SL and smooth a variation of the voltage between the power source line PL1 and the ground line SL.

The boost converter 10 has a transistor Q1 which is one example of the "upper switching element", a transistor Q2 which is one example of the "lower switching element", a diode D1, a diode D2 and a reactor W. The transistor Q1 and the transistor Q2 are connected in series between the power source line PL2 and the ground line SL. The diode D1 and the diode D2 are connected in parallel to the transistor Q1 and the transistor Q2, respectively. The reactor W is connected between the power source line PL1 and a point at which the transistor Q1 and the transistor Q2 are connected.

The boost converter 10 boosts the voltage at the power source line PL1 and outputs it to the power source line PL2, under the control of the ECU 60. More specifically, the boost converter 10 stores, as a magnetic field energy, a current which flows when the transistor Q2 is in an ON state into the reactor W and supplies the stored energy to the power source line PL2 via the diode D1 when the transistor Q2 is in an OFF state, and thus boosts the voltage at the power source line PL1 (in other words, sets any voltage which is larger than the voltage at the power source line PL1 to the voltage at the power source line PL2).

Incidentally, the longer a period during which the transistor Q2 is in the ON state is, the more the electrical power is stored in the reactor W, and thus an output with more high voltage can be obtained. On the other hand, the longer a period during which the transistor Q1 is in the ON state is, the more the voltage at the power source line PL2 decreases. Thus, any voltage which is larger than the voltage at the power source line PL1 can be set to the voltage at the power source line PL2 by controlling a duty ratio D of the transistor Q1 and the transistor Q2.

Incidentally, the boost converter 10 may output the voltage at the power source line PL1 to the power source line PL2 without boosting it by controlling the duty ratio D. Namely, the boost converter 10 may outputs the voltage at the power source line PL1 to the power source line PL2 as it is. Alternatively, the boost converter 10 may output the voltage at the power source line PL1 to the power source line PL2 after stepping down it or without stepping down it by controlling the duty ratio D.

The condenser C2 is connected between the power source line PL1 and the ground line SL and smooth a variation of the voltage between the power source line PL2 and the ground line SL.

The inverter 20 and the inverter 30 are disposed to correspond to the motor generator MG1 and the motor generator MG2, respectively. The inverter 20 makes the motor generator MG1 operate in a power running mode or a regeneration mode, under the control of the ECU 60. The inverter 30 makes the motor generator MG2 operates in a power running mode or a regeneration mode, under the control of the ECU 60.

ECU 60 constitutes one example of the "voltage conversion control apparatus" of the present invention and an electrical control unit which is configured to be capable of controlling a whole of the operation of the hybrid vehicle 100. The ECU 60 has a CPU (Central Processing Unit), a ROM (Read Only Memory), a RAM (Random Access Memory) and the like.

Especially in the present embodiment, the ECU 60 controls a boosting operation and a stepping-down operation (hereinafter, they are referred to as a "voltage conversion operation" as a whole) of the boost converter 10. Incidentally, the ECU 60 monitors an output voltage Vb of the electricity storage apparatus B (hereinafter, it is referred to as a "source voltage"), an output current IL of the electricity storage apparatus B (hereinafter, it is referred to as a "source current") and a voltage Vm between terminals of the condenser C2 (hereinafter, it is referred to as a "condenser voltage"), in order to control the voltage conversion operation of the boost converter 10. Incidentally, a logical or physical processing block which is prepared in the ECU 60 to control the voltage conversion operation of the boost converter 10 will be explained later.

Incidentally, the above described explanation uses the case where the hybrid vehicle 100 is a split type hybrid vehicle in which the engine 4 and the motor generators MG1 and MG2 are coupled with each other via the power dividing mechanism 3. However, even in a parallel type or series type hybrid vehicle which has one or two motor generator, the voltage conversion operation may be controlled in a below described manner as long as the hybrid vehicle has the boost converter 10. Alternatively, even in a vehicle which does not have the engine 4 (what we call an EV (Electrical Vehicle)), the voltage conversion operation may be controlled in a below described manner as long as the vehicle has the boost converter 10. The below described effects can be achieved in any case.

(2) Voltage Conversion Operation of Boost Converter

Next, with reference to FIG. 2 to FIG. 15, the voltage conversion operation of the boost converter 10 which is a unique operation of the hybrid vehicle 100 of the present embodiment will be explained. Incidentally, in what follows, five operation examples which are related to the voltage conversion operation of the boost converter 10 will be explained.

(2-1) First Operation Example

Firstly, with reference to FIG. 2 to FIG. 3, a first operation example of the voltage conversion operation of the boost converter 10 will be explained. FIG. 2 is a block diagram which illustrates an inner structure of the ECU 60 which performs the first operation example. FIG. 3 is a flowchart which illustrates a flow of the first operation example of the voltage conversion operation of the boost converter 10.

As illustrated in FIG. 2, the ECU 60 which performs the first operation example has a subtractor 611, a voltage control processor 612, a subtractor 613, a current control processor 614, a limiter 615, a duty switching controller 616, a duty switching determining unit 617, a carrier comparator 618 and a carrier generator 619. Incidentally, an operation of each component of the ECU 60 will be explained with the flow of the operation which is illustrated in FIG. 3.

As illustrated in FIG. 3, the ECU 60 obtains an operational parameter, in order to control the voltage conversion operation of the boost converter 10 (step S11). The source voltage Vb of the electricity storage apparatus B, the source current IL of the electricity storage apparatus B and the condenser voltage Vm of the condenser C2 are listed as examples of the operational parameter. Alternatively, an electromotive force Vbo (namely, the source voltage Vb when the source current IL is zero) of the electricity storage apparatus B, an internal resistance Rb of the electricity storage apparatus B, a maximum allowable current ILmax which corresponds to a maximum value of the current which can flow through the transistor Q1 and the transistor Q2 (in other words, a maximum value of the source current IL), a voltage command value Vm* which is a target value of the condenser voltage Vm and the like are listed as other examples of the operational parameter.

Then, the limiter 615 of the ECU 60 sets an upper limit value DH and a lower limit value DL of a duty ratio D which defines the operation of the boost converter 10 (step S12). Incidentally, in the present embodiment, the duty ratio D represents a rate of a period during which the transistor Q1 is in the ON state. Namely, in the present embodiment, duty ratio D=the period during which the transistor Q1 is in the ON state/(the period during which the transistor Q1 is in the ON state+a period during which the transistor Q2 is in the ON state). In what follows, an example of setting the upper limit value DH and the lower limit value DL of the duty ratio D will be explained.

For example, the limiter 615 may set the lower limit value DL of the duty ratio D in a viewpoint to maximize an electrical power BP which is outputted from the electricity storage apparatus B via the boost converter 10. For example, the limiter 615 may set, to the lower limit value DL of the duty ratio D, a duty ratio D which is capable of maximizing the electrical power BP which is outputted from the electricity storage apparatus B via the boost converter 10. More specifically, the electrical power BP which is outputted from the electricity storage apparatus B via the boost converter 10 is calculated from a formula of the condenser voltage Vm×the source current IL×the duty ratio D. Here, the source current IL is calculated from a formula of (the electromotive force Vbo of the electricity storage apparatus B−the duty ratio D×the condenser voltage Vm)/the internal resistance Rb of the electricity storage apparatus B. If the latter formula is incorporated into the former formula, it turns out that the electrical power BP which is outputted from the electricity storage apparatus B via the boost converter 10 is calculated from a formula of $-Vm^2/Rb\ (D-Vbo/2Vm)^2+Vbo^2/4Rb$. According to this formula, it turns out that the electrical power BP which is outputted from the electricity storage apparatus B via the boost converter 10 becomes the maximum value of $Vbo^2/4Rb$ when the duty ratio D is $Vbo/2Vm$. On the other hand, if the duty ratio D which is smaller than $Vbo/2Vm$ is used, the electrical power BP which is outputted from the electricity storage apparatus B via the boost converter 10 decreases. Therefore, the limiter 615 may set $Vbo/2Vm$ to the lower limit value DL of the duty ratio D.

Alternatively, the limiter 615 may set the upper limit value DH of the duty ratio D in a viewpoint to prevent an excess of the electrical power BP which is inputted to the electricity storage apparatus B via the boost converter 10 (namely, the electrical power which is inputted to the electricity storage apparatus B via the motor generators MG1 and MG2 when the electricity storage apparatus B is charged). For example, the limiter 615 may set, to the upper limit value DH of the duty ratio D, a duty ratio D which is capable of making a state where the electrical power BP (namely, the negative electrical power) which is inputted to the electricity storage apparatus B via the boost converter 10 is equal to a predetermined limit value Pblim (namely, it is a negative threshold value and it corresponds to an upper limit of the regeneration). Specifically, according to the above described formula of $BP=-Vm^2/Rb\ (D-Vbo/2Vm)^2+Vbo^2/4Rb$, it turns out that the duty ratio D which makes the state where the electrical power BP is the predetermine limit value Pblim is $(Vbo+(Vbo^2-4Rb\times Pblim)^{0.5})/2Vm$. Therefore, the limiter 615 may set $(Vbo+(Vbo^2-4Rb\times Pblim)^{0.5})/2Vm$ to the upper limit value DH of the duty ratio D.

Alternatively, the limiter 615 of the ECU 60 may set the upper limit value DH and the lower limit value DL of the duty ratio D in a viewpoint to ensure a dead time (namely, a period during which the transistor Q1 and the transistor Q2 are simultaneously in the OFF state) between the transistor Q1 and the transistor Q2. For example, the limiter 615 may set $2\times d/T$ to the lower limit value DL of the duty ratio D, wherein a cycle of a carrier which is generated by the carrier generator 619 is T and the period of the dead time is d. Alternatively, the limiter 615 may set $1-2\times d/T$ to the upper limit value DH of the duty ratio D.

Alternatively, the limiter 615 of the ECU 60 may set the upper limit value DH and the lower limit value DL of the duty ratio D on the basis of the maximum allowable current ILmax which corresponds to the maximum value of the current which can flow through the transistor Q1 and the transistor Q2 (in other words, the maximum value of the source current IL). For example, according to the above described formula of $(Vbo-D\times Vm)/Rb$ which represents the source current IL, it turns out that the duty ratio D can be expressed by a formula of "$(Vbo-Rb\times IL)/Vm$". Therefore, the limiter 615 may set $(Vbo-Rb\times ILmax)/Vm$ to the lower limit value DL of the duty ratio D. Furthermore, the limiter 615 may set $(Vbo-Rb\times(-ILmax))/Vm$ to the upper limit value DH of the duty ratio D. Incidentally, the maximum allowable current ILmax is a value whose sign becomes positive when the electricity storage apparatus B discharges (in other words, whose sign becomes negative when the electricity storage apparatus B is charged).

Incidentally, the above described upper limit value DH and the lower limit value DL are one example. Therefore, the limiter 615 may set the upper limit value DH and the lower limit value DL in another viewpoint.

Then, the ECU 60 calculates the duty ratio D (step S13). Specifically, the subtractor 611 of the ECU 60 calculates a voltage deviation $\Delta Vm$ ($=Vm^*-Vm$) which is obtained by subtracting the actual condenser voltage Vm from the voltage command value Vm* which is the target value of the condenser voltage Vm (namely, a required voltage which is required by the motor generators MG1 and MG2). Then, the voltage control processor 612 calculates a current command value IL* which is a target value of the source current IL on the basis of the voltage deviation $\Delta Vm$ which is outputted from the subtractor 611. Then, the subtractor 613 of the ECU 60 calculates a current deviation $\Delta IL$ ($=IL^*-IL$) which is obtained by subtracting the actual source current IL from the current command value IL* which is outputted from the voltage control processor 612. Then, the voltage control processor 614 calculates the duty ratio D on the basis of the current deviation $\Delta IL$. For example, the current control processor 614 may calculate the duty ratio D such that the current deviation $\Delta IL$ decreases or becomes zero. The duty ratio D which is calculated by the current control processor 614 is outputted to the limiter 615.

Then, the ECU 60 limits the duty ratio D which is calculated at the step S13 by the upper limit value DH and the lower limit value DL which are set at the step S12 (step S14). Specifically, the limiter 615 of the ECU 60 uses the upper limit value DH as the duty ratio D which is actually outputted to the duty switching controller 616, when the duty ratio D which is calculated at the step S13 is larger than the upper limit value DH which is set at the step S12. Namely, in this case, the limiter 615 outputs the upper limit value DH which is set at the step S12 to the duty switching controller 616. Similarly, the limiter 615 uses the lower limit value DL as the duty ratio D which is actually outputted to the duty switching controller 616, when the duty ratio D which is calculated at the step S13 is smaller than the lower limit value DL which is set at the step S12. Namely, in this case, the limiter 615 outputs the lower limit value DL which is set at the step S12 to the duty switching controller 616. On the other hand, the limiter 615 uses the duty ratio D which is calculated at the step S13 as the duty ratio D which is actually outputted to the duty switching controller 616, when the duty ratio D which is calculated at the step S13 is equal to or smaller than the upper limit value DH which is set at the step S12 and is equal to or larger than the lower limit value DL which is set at the step S12. Namely, in this case, the limiter 615 outputs the duty ratio D which is calculated at the step S13 to the duty switching controller 616.

Then, the duty switching determining unit 617 determines whether or not the current deviation ΔIL (=IL*-IL) which is outputted from the subtractor 613 is larger than a first threshold value TH1 (incidentally, TH1>0) (step S15). Incidentally, the duty switching determining unit 617 outputs the determination result to the duty switching controller 616.

As a result of the determination at the step S15, when it is determined that the current deviation ΔIL is larger than the first threshold value TH1 (step S15: Yes), it is determined that the source current IL is greatly different from the current command value IL*. Here, it is determined that the current deviation ΔIL is larger than the first threshold value TH1 when the source current IL is smaller than the current command value IL*. Thus, it is preferable that the source current IL increase rapidly to reach the current command value IL*. The reason is following: when the source current IL is greatly different from the current command value IL*, a difference between the electrical power which is outputted from the electricity storage apparatus B via the boost converter 10 and the electrical power which is required by the motor generators MG1 and MG2 becomes larger. As a result, a reduction of a capacitance of the condenser C2 (in other words, a reduction of a size) is prevented, because the electrical power which the condenser C2 should compensate becomes larger.

On the other hand, the duty ratio D which is outputted from the limiter 615 is limited by the lower limit value DL. Therefore, there is a possibility that it is more difficult for the duty ratio D which is limited by the lower limit value DL to allow a high response of the source current IL (namely, a rapid increase of the source current IL) than the duty ratio D which is not limited by the lower limit value DL. Thus, when it is determined that the current deviation ΔIL is larger than the first threshold value TH1, the lower limit value DL for limiting the duty ratio D which is outputted from the limiter 615 is relaxed (for example, decreases) in order to achieve the high response of the source current IL. Incidentally, the relaxation of the lower limit value DL may be realized by updating the lower limit value DL which is used by the limiter 615 (namely, using smaller lower limit value DL). Alternatively, the relaxation of the lower limit value DL may be realized by outputting, to the carrier comparator 618, the duty ratio D which is smaller than the lower limit value DL which is used by the limiter 615.

In the first operation example, the relaxation of the lower limit value DL is realized by outputting, to the carrier comparator 618, the duty ratio D which is smaller than the lower limit value DL which is used by the limiter 615. Specifically, in the first operation example, when it is determined that the current deviation ΔIL is larger than the first threshold value TH1, the high response of the source current IL is achieved by using a minimum duty ratio D of 0% instead of the duty ratio D which is outputted from the limiter 615. Namely, the duty switching controller 616 of the ECU 60 outputs, as the duty ratio D which is used to actually control the switching of the transistor Q1 and the transistor Q2, the minimum duty ratio D of 0% to the carrier comparator 618 instead of the duty ratio D which is outputted from the limiter 615 (step S16).

However, the lower limit value DL may be relaxed by the limiter 615 updating the lower limit value DL to 0% (namely, substantially canceling the lower limit value DL), instead of or in addition to the duty switching controller 616 outputting, to the carrier comparator 618, the duty ratio D which is smaller than the lower limit value DL which is used by the limiter 615. In this case, the duty switching controller 616 may output the duty ratio D, which is outputted from the limiter 615, to the carrier comparator 618 as it is.

As a result, the carrier comparator 618 generates a Q1 control signal which represents a timing of the switching of the transistor Q1 and a Q2 control signal which represents a timing of the switching of the transistor Q2 on the basis of the carrier which is generated by the carrier generator 619 and the duty ratio D which is outputted from the duty switching controller 616. Specifically, since the duty ratio D which is outputted from the duty switching controller 616 is 0%, the carrier comparator 618 generates the Q1 control signal which is always in the OFF state (in other words, a low level) and the Q2 control signal which is always in the ON state (in other words, a high level). As a result, the transistor Q1 is always in the OFF state and the transistor Q2 is always in the ON state. This state continues until it is determined that the current deviation ΔIL is not larger than the first threshold value TH1 (for example, the source current IL reaches the current command value IL*).

Then, same operation (namely, the operations from the step S11 to the step S18) is repeated.

Here, with reference to FIG. 4, a responsibility of the source current IL in the first operation example in which the duty ratio D is set to 0% will be explained by comparing it with a responsibility of the source current IL in a comparison example in which the duty ratio D is not set to 0%. FIG. 4 is a graph which illustrates the responsibility of the source current IL in the first operation example in which the duty ratio D is set to 0% and the responsibility of the source current IL in the comparison example in which the duty ratio D is not set to 0%.

As illustrated in an upper part of FIG. 4, the current command value IL*, which has been equal to the source current IL, starts to increase at a time T11. As a result, it is determined that the current deviation ΔIL is larger than the first threshold value TH1.

Here, as illustrated in a middle part of FIG. 4, the duty ratio D which is limited by the lower limit value DL is outputted to the carrier comparator 618 in the comparison example in which the duty ratio D is not set to 0%. Therefore, the period during which the transistor Q2 is in the ON state and which contributes the increase of the source current IL is ensured to a limit which depends on the lower limit value DL. Therefore, as illustrated in the upper part of FIG. 4 by using a thin solid line, the source current IL increases more slowly in the comparison example than in the first operation example. Therefore, a time which is required for the source current IL to reach the current command value IL* (namely, a time from the time T11 to a time T13) is longer in the comparison example.

On the other hand, as illustrated in a lower part of FIG. 4, the duty ratio D of 0% is outputted to the carrier comparator 618 in the first operation example in which the duty ratio D is set to 0%. Therefore, the period during which the transistor Q2 is in the ON state and which contributes the increase of the source current IL is ensured as much as possible. In other words, the transistor Q2 is always in the ON state until it is determined that the current deviation ΔIL is not larger than the first threshold value TH1 (for example, the source current IL reaches the current command value IL*). Therefore, as illustrated in the upper part of FIG. 4 by using a thick sold line, the source current IL increases more rapidly in the first operation example than in the comparison example. Incidentally, since the transistor Q2 is always in the ON state, the source current IL is capable of increasing at an increasing rate which is defined by a formula of the source voltage Vb/a reactance L of the reactor W in the first operation example. Namely, the responsibility of the source current IL is improved to a limit of a hardware of the electricity storage apparatus B and the boost converter 10, in the first operation example. Therefore, the time which is required for the source current IL to reach the current command value IL* (namely, a time from the time T11 to a time T12) is shorter in the first operation example than in the comparison example.

Incidentally, it is preferable that an appropriate value be set to the first threshold value TH1, which is used to determine whether or not the duty ratio D should be 0%, on the basis of a specification of the hybrid vehicle 100, a specification of the boost converter 10 and the like. For example, it is preferable that any value by which a state where the source current IL is preferably increased rapidly to reach the current command value IL* and a state where the source current IL is not necessarily increased rapidly to reach the current command value IL* can be distinguished be set to the first threshold value TH1. In other words, it is preferable that any value by which a state where the source current IL is preferably increased rapidly to reach the current command value IL* by relaxing the lower limit value DL which is set at the step S12 and a state where the source current IL is not necessarily increased rapidly to reach the current command value IL* by relaxing the lower limit value DL which is set at the step S12 can be distinguished be set to the first threshold value TH1.

Again in FIG. 3, on the other hand, as a result of the determination at the step S15, when it is determined that the current deviation ΔIL is not larger than the first threshold value TH1 (step S15: No), then, the duty switching determining unit 617 determines whether or not the current deviation ΔIL which is outputted from the subtractor 613 is smaller than a second threshold value TH2 (incidentally, TH2<0) (step S17). Incidentally, the duty switching determining unit 617 outputs the determination result to the duty switching controller 616.

As a result of the determination at the step S17, when it is determined that the current deviation ΔIL is smaller than the second threshold value TH2 (step S17: Yes), it is determined that the source current IL is greatly different from the current command value IL*. Here, it is determined that the current deviation ΔIL is smaller than the second threshold value TH2 when the source current IL is larger than the current command value IL*. Thus, it is preferable that the source current IL decrease rapidly to reach the current command value IL*. The reason is already described above.

On the other hand, the duty ratio D which is outputted from the limiter 615 is limited by the upper limit value DH. Therefore, there is a possibility that it is more difficult for the duty ratio D which is limited by the upper limit value DH to allow the high response of the source current IL (namely, a rapid decrease of the source current IL) than the duty ratio D which is not limited by the upper limit value DH. Thus, when it is determined that the current deviation ΔIL is smaller than the second threshold value TH2, the upper limit value DH for limiting the duty ratio D which is outputted from the limiter 615 is relaxed (for example, increases) in order to achieve the high response of the source current IL. Incidentally, the relaxation of the upper limit value DH may be realized by updating the upper limit value DH which is used by the limiter 615 (namely, using smaller upper limit value DH). Alternatively, the relaxation of the upper limit value DH may be realized by outputting, to the carrier comparator 618, the duty ratio D which is larger than the upper limit value DH which is used by the limiter 615.

In the first operation example, the relaxation of the upper limit value DH is realized by outputting, to the carrier comparator 618, the duty ratio D which is larger than the upper limit value DH which is used by the limiter 615. Specifically, in the first operation example, when it is determined that the current deviation ΔIL is smaller than the second threshold value TH2, the high response of the source current IL is achieved by using a maximum duty ratio D of 100% instead of the duty ratio D which is outputted from the limiter 615. Namely, the duty switching controller 616 of the ECU 60 outputs, as the duty ratio D which is used to actually control the switching of the transistor Q1 and the transistor Q2, the maximum duty ratio D of 100% to the carrier comparator 618 instead of the duty ratio D which is outputted from the limiter 615 (step S18).

However, the upper limit value DH may be relaxed by the limiter 615 updating the upper limit value DH to 100% (namely, substantially canceling the upper limit value DH), instead of or in addition to the duty switching controller 616 outputting, to the carrier comparator 618, the duty ratio D which is larger than the upper limit value DH which is used by the limiter 615. In this case, the duty switching controller 616 may output the duty ratio D, which is outputted from the limiter 615, to the carrier comparator 618 as it is.

As a result, the carrier comparator 618 generates the Q1 control signal and the Q2 control signal on the basis of the carrier which is generated by the carrier generator 619 and the duty ratio D which is outputted from the duty switching controller 616. Specifically, since the duty ratio D which is outputted from the duty switching controller 616 is 100%, the carrier comparator 618 generates the Q1 control signal which is always in the ON state and the Q2 control signal which is always in the OFF state. As a result, the transistor Q1 is always in the ON state and the transistor Q2 is always in the OFF state. This state continues until it is determined that the current deviation ΔIL is not smaller than the second threshold value TH2 (for example, the source current IL reaches the current command value IL*).

Then, same operation (namely, the operations from the step S11 to the step S18) is repeated.

Here, with reference to FIG. 5, the responsibility of the source current IL in the first operation example in which the duty ratio D is set to 100% will be explained by comparing it with the responsibility of the source current IL in a comparison example in which the duty ratio D is not set to 100%. FIG. 5 is a graph which illustrates the responsibility of the source current IL in the first operation example in which the duty ratio D is set to 100% and the responsibility of the source current IL in the comparison example in which the duty ratio D is not set to 100%.

As illustrated in an upper part of FIG. 5, the current command value IL*, which has been equal to the source current IL, starts to decrease at a time T21. As a result, it is determined that the current deviation ΔIL is smaller than the second threshold value TH2.

Here, as illustrated in a middle part of FIG. 5, the duty ratio D which is limited by the upper limit value DH is outputted to the carrier comparator 618 in the comparison example in which the duty ratio D is not set to 100%. Therefore, the period during which the transistor Q1 is in the ON state and which contributes the decrease of the source current IL is ensured to a limit which depends on the upper limit value DH. Therefore, as illustrated in the upper part of FIG. 5 by using a thin solid line, the source current IL decreases more slowly in the comparison example than in the first operation example. Therefore, the time which is required for the source current IL to reach the current command value IL* (namely, a time from the time T21 to a time T23) is longer in the comparison example.

On the other hand, as illustrated in a lower part of FIG. 5, the duty ratio D of 100% is outputted to the carrier comparator 618 in the first operation example in which the duty ratio D is set to 100%. Therefore, the period during which the transistor Q1 is in the ON state and which contributes the decrease of the source current IL is ensured as much as possible. In other words, the transistor Q1 is always in the ON state until it is determined that the current deviation ΔIL is not smaller than the second threshold value TH2 (for example, the source current IL reaches the current command value IL*). Therefore, as illustrated in the upper part of FIG. 5 by using a thick sold line, the source current IL decreases more rapidly in the first operation example than in the comparison example. Incidentally, since the transistor Q1 is always in the ON state, the source current IL is capable of decreasing at a decreasing rate which is defined by a formula of the source voltage Vb/the reactance L of the reactor W in the first operation example. Namely, the responsibility of the source current IL is improved to the limit of the hardware of the electricity storage apparatus B and the boost converter 10. Therefore, the time which is required for the source current IL to reach the current command value IL* (namely, a time from the time T21 to a time T22) is shorter in the first operation example than in the comparison example.

Incidentally, it is preferable that an appropriate value be set to the second threshold value TH2, which is used to determine whether or not the duty ratio D should be 100%, on the basis of the specification of the hybrid vehicle 100, the specification of the boost converter 10 and the like. For example, it is preferable that any value by which a state where the source current IL is preferably decreased rapidly to reach the current command value IL* and a state where the source current IL is not necessarily decreased rapidly to reach the current command value IL* can be distinguished be set to the second threshold value TH2. In other words, it is preferable that any value by which a state where the source current IL is preferably decreased rapidly to reach the current command value IL* by relaxing the upper limit value DH which is set at the step S12 and a state where the source current IL is not necessarily decreased rapidly to reach the current command value IL* by relaxing the upper limit value DH which is set at the step S12 can be distinguished be set to the second threshold value TH2.

Again in FIG. 3, on the other hand, as a result of the determination at the step S17, when it is determined that the current deviation ΔIL is not smaller than the second threshold value TH2 (step S17: No), it is determined that the source current IL is not greatly different from the current command value IL*. Thus, the source current IL is not necessarily increased or decreased rapidly to reach the current command value IL*. Therefore, in this case, the upper limit value DH and the lower limit value DL may not be necessarily relaxed. In this case, the duty switching controller 616 outputs, to the carrier comparator 618, the duty ratio D which is outputted from the limiter 615 as it is.

As described above, in the first operation example, the duty ratio D of 0% or 100% is used when the source current IL is greatly different from the current command value IL*. Thus, as described above, the high response of the source current IL is achieved. The high response of the source current IL results in a reduction of the difference between the electrical power which is required by the motor generators MG1 and MG2 and the electrical power BP which is outputted from the electricity storage apparatus B via the boost converter 10. The reduction of the difference between the electrical power which is required by the motor generators MG1 and MG2 and the electrical power BP which is outputted from the electricity storage apparatus B via the boost converter 10 results in the reduction of the capacitance of the condenser C2 which is disposed between the voltage converter 10 and the motor generators MG1 and MG2. Therefore, it is possible to reduce the size of the condenser C2 more by the reduction of the capacitance of the condenser C2.

In addition, in the first example, the duty ratio of 0% or 100% is used selectively at a period (what we call a transient period) during which the source current IL is greatly different from the current command value IL*. Therefore, in the first operation example, the "high response of the source current IL" which is achieved by the usage of the duty ratio D of 0% or 100% is prioritized over the "maximization of the electrical power BP which is outputted from the electricity storage apparatus B via the boost converter 10" which is achieved by the usage of the duty ratio D which is equal to or smaller than the upper limit value DH and which is equal to or larger than the lower limit value DL at the transient period. Here, generally, the transient period is often a period which is greatly shorter than a static period during which the source current IL is not greatly different from the current command value IL*. Namely, the period during which the usage of the duty ratio D of 0% or 100% may possibly undermine the effect of the maximization of the electrical power BP which is outputted from the electricity storage apparatus B via the boost converter 10 is actually very short. Therefore, even if the duty ratio D of 0% or 100% is used at the transient period, there is less or no adverse effect on the operation of the boost converter 10. In the first operation example, the boost converter 10 is controlled in an aspect which is suitable for each period while distinguishing the technical effect which should be important at the transient period and the technical effect which should be important at the static period. Therefore, it is possible to appropriately achieve the "high response of the source current IL" which is caused by the usage of the duty ratio D of 0% or 100% while appropriately achieving the "maximization of the electrical power BP which is outputted from the electricity storage apparatus B via the boost converter 10" which is caused by using the duty ratio which is equal to or smaller than the upper limit value DH and which is equal to or larger than the lower limit value DL.

In addition, in the first operation example, since the duty ratio D of 0% or 100% is used, the number of the switching of the transistor Q1 and the transistor Q2 is reduced, compared to the comparison example in which the duty ratio D of 0% or 100% is not used. Therefore, a loss which is caused by the switching is reduced and a heat generation which is caused by the switching of the transistor Q1 and the transistor Q2 is suppressed.

(2-2) Second Operation Example

Next, with reference to FIG. 6 and FIG. 7, a second operation example of the voltage conversion operation of the boost converter 10 will be explained. FIG. 6 is a block diagram which illustrates an inner structure of the ECU 60 which performs the second operation example. FIG. 7 is a flowchart which illustrates a flow of the second operation example of the voltage conversion operation of the boost converter 10. Incidentally, a detailed explanation of a component and an operation which are same as the component and the operation used in the first operation example is omitted by adding the same reference sign and same step number thereto.

As illustrated in FIG. 6, the ECU 60 which performs the second operation example is different from the ECU 60 which performs the first operation example in that it does not have the duty switching controller 616. The other feature of the ECU 60 which performs the second operation example is same as that of the ECU 60 which performs the first operation example. Incidentally, an operation of each component of the ECU 60 will be explained with the flow of the operation which is illustrated in FIG. 7.

As illustrated in FIG. 7, in the second operation example, the ECU 60 performs the operations from the step S11 to the step S13, as with the first operation example. Namely, the ECU 60 obtains the operational parameter (step S11). The limiter 615 sets the upper limit value DH and the lower limit value DL (step S12). The ECU 60 calculates the duty ratio D (step S13).

Then, in the second operation example, the duty switching determining unit 617 determines whether or not the current deviation ΔIL is larger than the first threshold value TH1 (step S15). Incidentally, the duty switching determining unit 617 outputs the determination result to the limiter 615.

As a result of the determination at the step S15, when it is determined that the current deviation ΔIL is larger than the first threshold value TH1 (step S15: Yes), it is preferable that the source current IL increase rapidly to reach the current command value IL*, as described above. Thus, in the second operation example, the limiter 615 relaxes the lower limit value DL by decreasing the lower limit value DL which is set at the step S12, in order to achieve the high response of the source current IL (step S21). In this case, the limiter 615 may decrease the lower limit value DL in any manner as long as it becomes smaller than the lower limit value DL which is set at the step S12. For example, when the lower limit value DL which is capable of maximizing the electrical power BP which is outputted from the electricity storage apparatus B via the boost converter 10 is set at the step S12, the limiter 615 may use, as the new lower limit value DL (namely, the relaxed or decreased lower limit value DL), the lower limit value DL which is capable of ensuring the dead time.

Incidentally, when the lower limit value DL becomes 0% by the decrease of the lower limit value DL, the second operation example is substantially same as the operation of the first operation example.

On the other hand, as a result of the determination at the step S15, when it is determined that the current deviation ΔIL is not larger than the first threshold value TH1 (step S15: No), then, the duty switching determining unit 617 determines whether or not the current deviation ΔIL is smaller than the second threshold value TH2 (step S17). Incidentally, the duty switching determining unit 617 outputs the determination result to the limiter 615.

As a result of the determination at the step S17, when it is determined that the current deviation ΔIL is smaller than the second threshold value TH2 (step S17: Yes), it is preferable that the source current IL decrease rapidly to reach the current command value IL*, as described above. Thus, in the second operation example, the limiter 615 relaxes the upper limit value DH by increasing the upper limit value DH which is set at the step S12, in order to achieve the high response of the source current IL (step S22). In this case, the limiter 615 may increase the upper limit value DH in any manner as long as it becomes larger than the upper limit value DH which is set at the step S12. For example, when the upper limit value DH which is capable of preventing the excess of the electrical power BP which is inputted to the electricity storage apparatus B via the boost converter 10 (namely, the electrical power which is inputted to the electricity storage apparatus B via the motor generators MG1 and MG2 when the electricity storage apparatus B is charged) is set at the step S12, the limiter 615 may use, as the new upper limit value DH (namely, the relaxed or increased upper limit value DH), the upper limit value DH which is capable of ensuring the dead time.

Incidentally, when the upper limit value DH becomes 100% by the increase of the upper limit value DH, the second operation example is substantially same as the operation of the first operation example.

On the other hand, as a result of the determination at the step S17, when it is determined that the current deviation ΔIL is not smaller than the second threshold value TH2 (step S17: No), the source current IL is not necessarily increased or decreased rapidly to reach the current command value IL*. Therefore, in this case, the upper limit value DH and the lower limit value DL may not be necessarily relaxed.

Then, the limiter 615 limits the duty ratio D which is calculated at the step S13 by the upper limit value DH and the lower limit value DL which are set at the step S12 or relaxed at the step S21 (step S14). Then, the carrier comparator 618 generates the Q1 control signal and the Q2 control signal on the basis of the duty ratio D which is outputted from the limiter 615.

Then, same operation (namely, the operations of the step S11 to the step S15, the step S17 and the step S21 to the step S22) is repeated.

Here, with reference to FIG. 8 and FIG. 9, a responsibility of the source current IL in the second operation example in which the upper limit value DH and the lower limit value DL are relaxed will be explained by comparing it with a responsibility of the source current IL in a comparison example in which the upper limit value DH and the lower limit value DL are not relaxed. FIG. 8 is a graph which illustrates the responsibility of the source current IL in the second operation example in which the lower limit value DL is relaxed and the responsibility of the source current IL in the comparison example in which the lower limit value DL is not relaxed. FIG. 9 is a graph which illustrates the responsibility of the source current IL in the second operation example in which the upper limit value DH is relaxed and the responsibility of the source current IL in the comparison example in which the upper limit value DH is not relaxed.

As illustrated in an upper part of FIG. 8, the current command value IL*, which has been equal to the source current IL, starts to increase at a time T31. As a result, it is determined that the current deviation ΔIL is larger than the first threshold value TH1.

Here, as illustrated in a middle part of FIG. 8, the duty ratio D which is limited by the not-relaxed lower limit value DL is outputted to the carrier comparator 618 in the comparison example in which the lower limit value DL is not relaxed. Therefore, the period during which the transistor Q2 is in the ON state and which contributes the increase of the source current IL is shorter in the comparison example than in the second operation example. Therefore, as illustrated in the upper part of FIG. 8 by using a thin solid line, the source current IL increases more slowly in the comparison example than in the second operation example. Therefore, the time which is required for the source current IL to reach the current command value IL* (namely, a time from the time T31 to a time T33) is longer in the comparison example than in the second operation example.

On the other hand, as illustrated in a lower part of FIG. 8, the duty ratio D which is limited by the relaxed lower limit value DL is outputted to the carrier comparator 618 in the second operation example in which the lower limit value DL is relaxed. Therefore, the period during which the transistor Q2 is in the ON state and which contributes the increase of the source current IL is longer in the second operation example than in the comparison example. Therefore, as illustrated in the upper part of FIG. 8 by using a thick sold line, the source current IL increases more rapidly in the second operation example than in the comparison example. Therefore, the time which is required for the source current IL to reach the current command value IL* (namely, a time from the time T31 to a time T32) is shorter in the second operation example than in the comparison example.

Similarly, as illustrated in an upper part of FIG. 9, the current command value IL*, which has been equal to the source current IL, starts to decrease at a time T41. As a result, it is determined that the current deviation ΔIL is smaller than the second threshold value TH2.

Here, as illustrated in a middle part of FIG. 9, the duty ratio D which is limited by the not-relaxed upper limit value DH is outputted to the carrier comparator 618 in the comparison example in which the upper limit value DH is not relaxed. Therefore, the period during which the transistor Q1 is in the ON state and which contributes the decrease of the source current IL is shorter in the comparison example than in the second operation example. Therefore, as illustrated in the upper part of FIG. 9 by using a thin solid line, the source current IL decreases more slowly in the comparison example than in the second operation example. Therefore, the time which is required for the source current IL to reach the current command value IL* (namely, a time from the time T41 to a time T43) is longer in the comparison example than in the second comparison example.

On the other hand, as illustrated in the lower part of FIG. 9, the duty ratio D which is limited by the relaxed upper limit value DH is outputted to the carrier comparator 618 in the second operation example in which the upper limit value DH is relaxed. Therefore, the period during which the transistor Q1 is in the ON state and which contributes the decrease of the source current IL is longer in the second operation example than in the comparison example. Therefore, as illustrated in the upper part of FIG. 9 by using a thick sold line, the source current IL decreases more rapidly in the second operation example than in the comparison example. Therefore, the time which is required for the source current IL to reach the current command value IL* (namely, a time from the time T41 to a T42) is shorter in the second operation example than in the comparison example.

As described above, in the second operation example, at least one of the upper limit value DH and the lower limit value DL is relaxed when the source current IL is greatly different from the current command value IL*. Thus, as described above, the high response of the source current IL is achieved. Therefore, the effect which is same as that in the first operation example can be achieved in the second operation example.

However, in the second example, when the duty ratio D of 0% or 100% is not used, the effects of the reduction of the loss which is caused by the switching and the suppression of the heat generation which is caused by the switching of the transistor Q1 and the transistor Q2 are reduced. However, in the second operation example, there is an advantage of appropriately ensuring the dead time between the transistor Q1 and the transistor Q2, because the duty ratio D of 0% or 100% is not necessarily used.

(2-3) Third Operation Example

Next, with reference to FIG. 10 and FIG. 11, a third operation example of the voltage conversion operation of the boost converter 10 will be explained. FIG. 10 is a block diagram which illustrates an inner structure of the ECU 60 which performs the third operation example. FIG. 11 is a flowchart which illustrates a flow of the third operation example of the voltage conversion operation of the boost converter 10. Incidentally, a detailed explanation of a component and an operation which are same as the component and the operation used in the first operation example is omitted by adding the same reference sign and same step number thereto.

As illustrated in FIG. 10, the ECU 60 which performs the third operation example is different from the ECU 60 which performs the first operation example in that it further has a threshold value setting unit 631. The other feature of the ECU 60 which performs the third operation example is same as that of the ECU 60 which performs the first operation example. Incidentally, an operation of each component of the ECU 60 will be explained with the flow of the operation which is illustrated in FIG. 11.

As illustrated in FIG. 11, in the third operation example, the ECU 60 performs the operations from the step S11 to the step S14, as with the first operation example. Namely, the ECU 60 obtains the operational parameter (step S11). The limiter 615 sets the upper limit value DH and the lower limit value DL (step S12). The ECU 60 calculates the duty ratio D (step S13). The ECU 60 limits the duty ratio D which is calculated at the step S13 by the upper limit value DH and the lower limit value DL which are set at the step S12 (step S14).

Then, in the third operation example, the threshold value setting unit 631 of the ECU 60 determines whether or not an element temperature of at least one of the transistor Q1 and the transistor Q2 is equal to or larger than a predetermined temperature (step S31). Incidentally, the threshold value setting unit 631 may directly monitor the element temperature. Alternatively, the threshold value setting unit 631 may monitor another parameter which indirectly represents the element temperature. A source current IL is listed as one example of another parameter which indirectly represents the element temperature, for example. The threshold value setting unit 631 may predict that the element temperature is higher as the source current IL is larger.

As a result of the determination at the step S31, when it is determined that the element temperature is equal to or larger than the predetermined temperature (step S31: Yes), the threshold value setting unit 631 sets a value which is smaller than a usual value to the first threshold value TH1. The threshold value setting unit 631 sets a value which is larger than a usual value to the second threshold value TH2, in addition to or instead of setting the first threshold value TH1.

On the other hand, as a result of the determination at the step S31, when it is determined that the element temperature is not equal to or larger than the predetermined temperature (step S31: No), the threshold value setting unit 631 sets the usual value to the first threshold value TH1. The threshold value setting unit 631 sets the usual value to the second threshold value TH2, in addition to or instead of setting the first threshold value TH1.

Namely, in the third operation example, at least one of the first threshold value TH1 and the second threshold value TH2 is adjusted on the basis of the element temperature of at least one of the transistor Q1 and the transistor Q2. Incidentally, in the above described explanation, the first threshold value TH1 and the second threshold value TH2 are set on the basis of whether or not the element temperature is equal to or larger than the single predetermined temperature. However, the first threshold value TH1 which decreases in a stepwise manner as the temperature becomes higher and the second threshold value TH2 which increases in a stepwise manner as the temperature becomes higher may be set. Alternatively, the first threshold value TH1 which decreases in a continuous manner as the temperature becomes higher and the second threshold value TH2 which increases in a continuous manner as the temperature becomes higher may be set.

Then, in the third operation example, the operations from the step S15 to the step S18 are performed, as with the first operation example. Namely, when it is determined that the current deviation ΔIL is larger than the first threshold value TH1 (step S15: Yes), the duty switching controller 616 outputs the duty ratio D of 0% to the carrier comparator 618 instead of the duty ratio D which is outputted from the limiter 615 (step S16). On the other hand, when it is determined that the current deviation ΔIL is smaller than the second threshold value TH2 (step S17: Yes), the duty switching controller 616 outputs the duty ratio D of 100% to the carrier comparator 618 instead of the duty ratio D which is outputted from the limiter 615 (step S18).

Then, same operation (namely, the operations of the step S11 to the step S18 and the step S31 to the step S33) is repeated.

As described above, the effect which is same as that in the first operation example can be achieved in the third operation example.

In addition, in the third operation example, the first threshold value TH1 is smaller in the case where the element temperature is larger than the predetermined temperature than in the case where the element temperature is equal to or smaller than the predetermined temperature, and thus it is determined more easily that the current deviation ΔIL is larger than the first threshold value TH1. As a result, the duty ratio D of 0% is used more easily (alternatively, the lower limit value DL is relaxed more easily) in the case where the element temperature is larger than the predetermined temperature than in the case where the element temperature is equal to or smaller than the predetermined temperature. Similarly, in the third operation example, the second threshold value TH2 is larger in the case where the element temperature is larger than the predetermined temperature than in the case where the element temperature is equal to or smaller than the predetermined temperature, and thus it is determined more easily that the current deviation ΔIL is smaller than the second threshold value TH2. As a result, the duty ratio D of 100% is used more easily (alternatively, the upper limit value DH is relaxed more easily) in the case where the element temperature is larger than the predetermined temperature than in the case where the element temperature is equal to or smaller than the predetermined temperature. As a result, when the element temperature is larger than the predetermined temperature, the number of the switching of the transistor Q1 and the transistor Q2 is reduced (alternatively, the switching is not substantially or absolutely performed), compared to the case where the element temperature is equal to or smaller than the predetermined temperature. Therefore, the increase of the element temperature of the transistor Q1 and the transistor Q2 is suppressed, because the switching which may cause the heat generation of the transistor Q1 and the transistor Q2 is suppressed.

Incidentally, even in the third operation example, the lower limit value DL may be relaxed instead of the usage of the duty ratio D of 0%, as with the second operation example. Similarly, the upper limit value DH may be relaxed instead of the usage of the duty ratio D of 100%.

(2-4) Fourth Operation Example

Next, with reference to FIG. 12 and FIG. 13, a fourth operation example of the voltage conversion operation of the boost converter 10 will be explained. FIG. 12 is a block diagram which illustrates an inner structure of the ECU 60 which performs the fourth operation example. FIG. 13 is a flowchart which illustrates a flow of the fourth operation example of the voltage conversion operation of the boost converter 10. Incidentally, a detailed explanation of a component and an operation which are same as the component and the operation used in the first operation example is omitted by adding the same reference sign and same step number thereto.

As illustrated in FIG. 12, the ECU 60 which performs the fourth operation example is different from the ECU 60 which performs the first operation example in that it further has a hold time setting unit 641. The other feature of the ECU 60 which performs the fourth operation example is same as that of the ECU 60 which performs the first operation example. Incidentally, an operation of each component of the ECU 60 will be explained with the flow of the operation which is illustrated in FIG. 13.

As illustrated in FIG. 13, in the fourth operation example, the ECU 60 performs the operations from the step S11 to the step S15 and the step S17, as with the first operation example. Namely, the ECU 60 obtains the operational parameter (step S11). The limiter 615 sets the upper limit value DH and the lower limit value DL (step S12). The ECU 60 calculates the duty ratio D (step S13). The ECU 60 limits the duty ratio D which is calculated at the step S13 by the upper limit value DH and the lower limit value DL which are set at the step S12 (step S14). The duty switching determining unit 617 determines whether or not the current deviation ΔIL is larger than the first threshold value TH1 (step S15). In addition, the duty switching determining unit 617 determines whether or not the current deviation ΔIL is smaller than the second threshold value TH2 (step S17).

As a result of the determination at the step S15, when it is determined that the current deviation ΔIL is larger than the first threshold value TH1 (step S15: Yes), the hold time setting unit 641 sets a hold time t1 over which 0% is set to the duty ratio D (step S41). For example, the hold time setting unit 641 may set, to the hold time t1, a value which is calculated from a formula of (the reactance L of the reactor W/the source voltage Vb)×the current deviation ΔIL. The value which is calculated from the formula of (the reactance L of the reactor W/the source voltage Vb)×the current deviation ΔIL corresponds to a time which is needed to make the current deviation ΔIL zero (namely, to make the current deviation ΔIL reach the current command value IL*) in using the duty ratio D of 0%.

Then, the duty switching controller 616 outputs the duty ratio D of 0% to the carrier comparator 618 instead of the duty ratio D which is outputted from the limiter 615 until the hold time t1 passes (step S16 and step S43).

Moreover, as a result of the determination at the step S17, when it is determined that the current deviation ΔIL is smaller than the second threshold value TH2 (step S17: Yes), the hold time setting unit 641 sets a hold time t2 over which 100% is set to the duty ratio D (step S42). For example, the hold time setting unit 641 may set, to the hold time t2, a value which is calculated from a formula of (the reactance L of the reactor W/(the source voltage Vb−the condenser voltage Vm))×the current deviation ΔIL. The value which is calculated from the formula of (the reactance L of the reactor W/(the source voltage Vb−the condenser voltage Vm))×the current deviation ΔIL corresponds to a time which is needed to make the current deviation ΔIL zero (namely, to make the current deviation ΔIL reach the current command value IL*) in using the duty ratio D of 100%.

Then, the duty switching controller 616 outputs the duty ratio D of 100% to the carrier comparator 618 instead of the duty ratio D which is outputted from the limiter 615 until the hold time t2 passes (step S18 and step S44).

Then, same operation (namely, the operations of the step S11 to the step S18 and the step S41 to the step S44) is repeated.

As described above, the effect which is same as that in the first operation example can be achieved in the fourth operation example.

In addition, in the fourth operation example, a period during which the switching is performed by using the duty ratio D of 0% or 100% is limited to the minimum. In addition, the source current IL is capable of reaching the current command value IL* at a desired timing, when the switching starts at a timing which is calculated by a back calculation from the time which is required for the source current IL to reach the current command value IL* (namely, the above described hold time t1 and hold time t2). In other words, the source current IL is capable of reaching the current command value IL* at the desired timing which is different from a timing which is determined by the carrier generated by the carrier generator 619.

Incidentally, even in the fourth operation example, the lower limit value DL may be relaxed instead of the usage of the duty ratio D of 0%, as with the second operation example. Similarly, the upper limit value DH may be relaxed instead of the usage of the duty ratio D of 100%.

(2-5) Fifth Operation Example

Next, with reference to FIG. 14 and FIG. 15, a fifth operation example of the voltage conversion operation of the boost converter 10 will be explained. FIG. 14 is a block diagram which illustrates an inner structure of the ECU 60 which performs the fifth operation example. FIG. 15 is a flowchart which illustrates a flow of the fifth operation example of the voltage conversion operation of the boost converter 10. Incidentally, a detailed explanation of a component and an operation which are same as the component and the operation used in the first operation example is omitted by adding the same reference sign and same step number thereto.

As illustrated in FIG. 14, the ECU 60 which performs the fifth operation example is different from the ECU 60 which performs the first operation example in that it does not have the duty switching controller 616 and the location and the operation of the duty switching determining unit 617 differ. The other feature of the ECU 60 which performs the fifth operation example is same as that of the ECU 60 which performs the first operation example. Incidentally, an operation of each component of the ECU 60 will be explained with the flow of the operation which is illustrated in FIG. 13.

As illustrated in FIG. 15, in the fifth operation example, the operational parameter is obtained (step S11), as with the first operation example.

Then, the limiter sets a standard upper limit value DH1, a standard lower limit value DL1, a relaxed upper limit value DH2 which is larger than the standard upper limit value DH1 and a relaxed lower limit value DL2 which is smaller than the standard lower limit value DL1 (step S51).

The standard upper limit value DH1 and the relaxed upper limit value DH2 may be any values as long as such a condition that the relaxed upper value DH2 is larger than the standard upper limit value DH1 (namely, is relaxed) is satisfied. For example, the upper limit value DH which is capable of preventing the excess of the electrical power BP which is inputted to the electricity storage apparatus B via the boost converter 10 (namely, the electrical power which is inputted to the electricity storage apparatus B via the motor generators MG1 and MG2 when the electricity storage apparatus B is charged) may be used as the standard upper limit value DH1 and the upper limit value DH which is capable of ensuring the dead time may be used as the relaxed upper limit value DH2. Alternatively, the relaxed upper limit value DH2 may be 100%.

Similarly, the standard lower limit value DL1 and the relaxed lower limit value DL2 may be any values as long as such a condition that the relaxed lower value DL2 is smaller than the standard lower limit value DL1 (namely, is relaxed) is satisfied. For example, the lower limit value DL which is capable of maximizing the electrical power BP which is outputted from the electricity storage apparatus B via the boost converter 10 may be used as the standard lower limit value DL1 and the lower limit value DL which is capable of ensuring the dead time may be used as the relaxed lower limit value DL2. Alternatively, the relaxed lower limit value DL2 may be 0%.

Then, the ECU 60 calculates the duty ratio D (step S13).

Then, the duty switching determining unit 617 determines whether or not a period during which such a state that the duty ratio D calculated at the step S13 is smaller than the standard lower limit value DL1 continues is equal to or smaller than a predetermined time (step S52). Incidentally, the duty switching determining unit 617 outputs the determination result to the limiter 615.

As a result of the determination at the step S52, when it is determined that the period during which such a state that the duty ratio D is smaller than the standard lower limit value DL1 continues is equal to or smaller than the predetermined time (step S52: Yes), the limiter 615 limits the duty ratio D which is calculated at the step S13 by the relaxed lower limit value DL2 which is set at the step S51 (step S53).

On the other hand, as a result of the determination at the step S52, when it is determined that the period during which such a state that the duty ratio D is smaller than the standard lower limit value DL1 continues is not equal to or smaller than the predetermined time (step S52: No), the limiter 615 limits the duty ratio D which is calculated at the step S13 by the standard lower limit value DL1 which is set at the step S51 (step S54).

Subsequent to, after/before or in parallel with the operations from the step S52 to the step S54, the duty switching determining unit 617 determines whether or not a period during which such a state that the duty ratio D calculated at the step S13 is larger than the standard upper limit value DH1 continues is equal to or smaller than a predetermined time (step S55). Incidentally, the duty switching determining unit 617 outputs the determination result to the limiter 615.

As a result of the determination at the step S55, when it is determined that the period during which such a state that the duty ratio D is larger than the standard upper limit value DH1 continues is equal to or smaller than the predetermined time (step S55: Yes), the limiter 615 limits the duty ratio D which is calculated at the step S13 by the relaxed upper limit value DH2 which is set at the step S51 (step S56).

On the other hand, as a result of the determination at the step S55, when it is determined that the period during which such a state that the duty ratio D is larger than the standard upper limit value DH1 continues is not equal to or smaller than the predetermined time (step S55: No), the limiter 615 limits the duty ratio D which is calculated at the step S13 by the standard upper limit value DH1 which is set at the step S51 (step S57).

Then, same operation (namely, the operations of the step S11, the step S13 and the step S51 to the step S57) is repeated.

Here, the reason why the operations from the step S52 to the step S57 are performed will be explained.

The duty ratio D which is not yet limited by the standard lower limit value DL1 is likely smaller than the standard lower limit value DL1 at the transient period during which the source current IL is greatly different from the current command value IL* (namely, the current deviation ΔIL is relatively large). The reason is following: the duty ratio D which is smaller than the standard lower limit value DL1 is likely to be calculated for the purpose of the rapid increase of the source current IL (namely, the cancelation of the difference between the source current IL and the current command value IL*). In other words, the duty ratio D which is smaller than the standard lower limit value DL1 contributes the rapid increase of the source current IL (namely, the cancelation of the difference between the source current IL and the current command value IL*) more than the duty ratio D which is larger than the standard lower limit value DL1. Thus, it is preferable that the source current IL rapidly increase by limiting the duty ratio D by using the relaxed lower limit value DL2 which is smaller than the standard lower limit value DL1 at the period during which such a state that the duty ratio D is smaller than the standard lower limit value DL1 continues.

On the other hand, when the period during which such a state that the duty ratio D is smaller than the standard lower limit value DL1 continues is equal to or larger than the predetermined time, it is predicted that the source current IL has already increased to some level (namely, is close to the source current IL*), because the switching has been performed on the basis of the relatively small duty ratio D which is limited by the relaxed lower limit value DL2 over some period. Namely, it is predicted that the source current IL does not necessarily increase rapidly. Thus, when the period during which such a state that the duty ratio D is smaller than the standard lower limit value DL1 continues is not equal to or smaller than the predetermined time, it is preferable that the duty ratio D be limited by the standard lower limit value DL1.

Similarly, the duty ratio D which is not yet limited by the standard upper limit value DH1 is likely larger than the standard upper limit value DH1 at the transient period during which the source current IL is greatly different from the current command value IL* (namely, the current deviation ΔIL is relatively large). The reason is following: the duty ratio D which is larger than the standard upper limit value DH1 is likely to be calculated for the purpose of the rapid decrease of the source current IL (namely, the cancelation of the difference between the source current IL and the current command value IL*). Namely, the duty ratio D which is larger than the standard upper limit value DH1 contributes the rapid decrease of the source current IL (namely, the cancelation of the difference between the source current IL and the current command value IL*) more than the duty ratio D which is smaller than the standard upper limit value DH1. Thus, it is preferable that the source current IL rapidly decrease by limiting the duty ratio D by using the relaxed upper limit value DH2 which is larger than the standard upper limit value DH1 at the period during which the duty ratio D is larger than the standard upper limit value DH1.

On the other hand, when the period during which such a state that the duty ratio D is smaller than the standard upper limit value DH1 continues is equal to or larger than the predetermined time, it is predicted that the source current IL has already decreased to some level (namely, is close to the source current IL*), because the switching has been performed on the basis of the relatively large duty ratio D which is limited by the relaxed upper limit value DH2 over some period. Namely, it is predicted, that the source current IL does not necessarily decrease rapidly. Thus, when the period during which such a state that the duty ratio D is larger than the standard upper limit value DH1 continues is not equal to or smaller than the predetermined time, it is preferable that the duty ratio D be limited by the standard upper limit value DH1.

As described above, the effect which is same as that in the first operation example can be achieved in the fifth operation example.

In addition, as described above, the period during which such a state that the duty ratio D is smaller than the standard lower limit value DL1 continues is closely related to the determination result of whether or not the source current IL is greatly different from the current command value IL* (namely, the current deviation ΔIL is smaller than the first threshold value TH1), substantially. Similarly, the period during which such a state that the duty ratio D is larger than the standard upper limit value DH1 continues is closely related to the determination result of whether or not the source current IL is greatly different from the current command value IL* (namely, the current deviation ΔIL is larger than the second threshold value TH2), substantially. Therefore, in the fifth operation example, the duty switching determining unit 617 is capable of relaxing the upper limit value DH and the lower limit value DL by indirectly monitoring the current deviation ΔIL (namely, monitoring another parameter which is closely related to the variation of the current deviation ΔIL), instead of directly monitoring the current deviation ΔIL.

Incidentally, even in the fifth operation example, the lower limit value DL may be relaxed instead of the usage of the duty ratio D of 0%, as with the second operation example. Similarly, the upper limit value DH may be relaxed instead of the usage of the duty ratio D of 100%.

The present invention can be changed, if desired, without departing from the essence or spirit of the invention which can be read from the claims and the entire specification. A voltage converter control apparatus, which involves such changes, is also intended to be within the technical scope of the present invention.

REFERENCE SIGNS LIST 2 wheel
3 power dividing mechanism
4 engine
10 boost converter
20 inverter
30 inverter
60 ECU
611, 613 substractor
612 voltage control processor
614 current control processor
615 limiter
616 duty switching controller
617 duty switching determining unit
618 carrier comparator
619 carrier generator
631 threshold value setting unit
641 hold time setting unit
B electricity storage apparatus
C1, C2 condenser
D1, D2 diode
PL1, PL2 power source line
Q1, Q2 transistor
SL ground line
Vb source voltage
Vm condenser voltage
IL source current
IL* current command value
MG1, MG2 motor generator

The invention claimed is:

1. A voltage conversion control apparatus which controls a boost converter, the boost converter being capable of boosting or stepping down an output voltage of an electricity storage apparatus and having an upper switching element at a high potential side and a lower switching element at a low potential side which are connected in series, the voltage conversion control apparatus comprising a controller:

the controller being configured to calculate a duty ratio such that an output current of the electricity storage apparatus reaches a target value and the duty ratio is within a predetermined allowable range, wherein the duty ratio represents a rate of a period during which the upper switching element is turned on;

the controller being configured to relax at least one of an upper limit value and a lower limit value of the allowable range on the basis of a magnitude relationship between a predetermined threshold value and a current deviation which is obtained by subtracting the output current from the target value; and the controller being configured to control the upper switching element and the lower switching element to perform a switching control on the basis of the duty ratio which is calculated by the controller, the controller being configured to control the upper switching element and the lower switching element to perform the switching control on the basis of the duty ratio which is within the allowable range which is relaxed by the controller until a period which is required for the output current to reach the target value passes.

2. The voltage conversion control apparatus according to claim 1, wherein when the current deviation is larger than a first threshold value that is a positive value, the controller is configured to make the lower limit value smaller than the case where the current deviation is equal to or smaller than the first threshold value.

3. The voltage conversion control apparatus according to claim 1, wherein when the current deviation is larger than a first threshold value that is a positive value, the controller is configured to set 0% to the lower limit value.

4. The voltage conversion control apparatus according to claim 1, wherein when the current deviation is smaller than a second threshold that is a negative value, the controller is configured to make the upper limit value larger than the case where the current deviation is equal to or larger than the second threshold value.

5. The voltage conversion control apparatus according to claim 1, wherein when the current deviation is smaller than a second threshold value that is a negative value, the controller is configured to set 100% to the upper limit value.

6. The voltage conversion control apparatus according to claim 1, wherein the controller is configured to change the predetermined threshold value on the basis of an element temperature of at least one of the upper switching element and the lower switching element.

7. The voltage conversion control apparatus according to claim 6, wherein when the current deviation is larger than a first threshold value that is a positive value, the controller is configured to relax the lower limit value, compared to the case where the current deviation is equal to or smaller than the first threshold value, the controller is configured to change the first threshold value such that the first threshold value in the case where the element temperature is larger than a predetermined temperature is smaller than the first threshold value in the case where the element temperature is equal to or smaller than the predetermined temperature.

8. The voltage conversion control apparatus according to claim 6, wherein when the current deviation is smaller than a second threshold that is a negative value, the controller is configured to relax the upper limit value, compared to the case where the current deviation is equal to or larger than the second threshold value, the controller is configured to change the second threshold value such that the second threshold value in the case where the element temperature is larger than a predetermined temperature is larger than the second threshold value in the case where the element temperature is equal to or smaller than the predetermined temperature.

9. The voltage conversion control apparatus according to claim 1, wherein the controller is configured to relax at least one of the upper limit value and the lower limit value on the basis of an elapsed period after a first duty ratio which is calculated by the controller starts to be beyond the not-relaxed allowable range, wherein the controller does not use the allowable range when the controller calculates the first duty ratio.

10. The voltage conversion control apparatus according to claim 9, wherein
the controller is configured to relax relaxes the lower limit value, when an elapsed period after the first duty ratio starts to be smaller than the not-relaxed lower limit value is equal to or smaller than a predetermined period.

11. The voltage conversion control apparatus according to claim 9, wherein
the controller is configured to relax the upper limit value, when an elapsed period after the first duty ratio starts to be larger than the not-relaxed upper limit value is equal to or smaller than a predetermined period.

\* \* \* \* \*